(12) United States Patent
Sakai et al.

(10) Patent No.: US 8,564,580 B2
(45) Date of Patent: Oct. 22, 2013

(54) DISPLAY DEVICE AND ELECTRONIC APPARATUS

(75) Inventors: Eiji Sakai, Kanagawa (JP); Takayuki Nakanishi, Kanagawa (JP); Seiji Uejima, Kanagawa (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 1057 days.

(21) Appl. No.: 12/270,281

(22) Filed: Nov. 13, 2008

(65) Prior Publication Data

US 2009/0135167 A1    May 28, 2009

(30) Foreign Application Priority Data

Nov. 26, 2007    (JP) .................................. 2007-304341

(51) Int. Cl.
G06F 3/038    (2013.01)
(52) U.S. Cl.
USPC ........... 345/207; 345/204; 345/166; 250/205; 250/206; 250/553
(58) Field of Classification Search
USPC .................................................. 345/207, 76
See application file for complete search history.

(56) References Cited

U.S. PATENT DOCUMENTS

2006/0244693 A1 * 11/2006 Yamaguchi et al. ............ 345/76

FOREIGN PATENT DOCUMENTS

| JP | 10-065135 | | 3/1998 |
|---|---|---|---|
| JP | 11-134105 | | 5/1999 |
| JP | 02-041244 | | 2/2002 |
| JP | 2002-149085 | | 5/2002 |
| JP | 2004-318067 | | 11/2004 |
| JP | 2004-318819 | | 11/2004 |
| JP | 2004318819 A | * | 11/2004 |
| JP | 2006-118965 | | 5/2006 |
| JP | 2006-251806 | | 9/2006 |
| JP | 2006-313974 | | 11/2006 |
| JP | 2006313974 A | * | 11/2006 |
| JP | 2007-018458 | | 1/2007 |
| JP | 2007018458 A | * | 1/2007 |
| JP | 2007-114315 | | 5/2007 |
| JP | 2007114315 A | * | 5/2007 |
| JP | 2007-205902 | | 8/2007 |
| JP | 2007-310628 | | 11/2007 |
| JP | 2008-233257 | | 10/2008 |
| JP | 2009-128686 | | 6/2009 |
| WO | 2006-118028 | | 11/2006 |

OTHER PUBLICATIONS

Japanese Office Action for corresponding JP2007-304341 issued on Feb. 9, 2010.

(Continued)

*Primary Examiner* — Quan-Zhen Wang
*Assistant Examiner* — Troy Dalrymple
(74) *Attorney, Agent, or Firm* — K&L Gates LLP

(57) ABSTRACT

Disclosed herein is a display device including a first light sensor unit configured to include a light-receiving element and detect intensity of ambient light to a display area; a second light sensor unit configured to include a light-receiving element and be provided with an infrared filter disposed on an optical path to the light-receiving element; and a signal processor configured to execute difference processing for a detection signal of the first light sensor unit and a detection signal of the second light sensor unit, wherein the infrared filter is formed by stacking at least two kinds of color filters.

18 Claims, 37 Drawing Sheets

(56) References Cited

OTHER PUBLICATIONS

Japanese Office Action for corresponding JP2007-304341, issued on May 6, 2010.

Japanese Office Action issued Sep. 26, 2012 for corresponding Japanese Appln. No. 2010-238549.

Japanese Office Action issued Oct. 23, 2012 in corresponding Japanese Appln. No. 2010-238549.

* cited by examiner

ABSORPTION SPECTRA OF CF

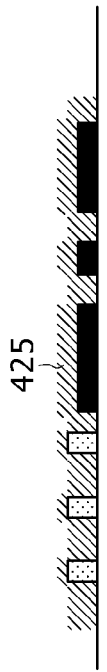
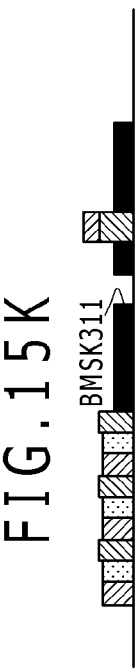
FIG.15G  FIG.15H  FIG.15I  FIG.15J  FIG.15K  FIG.15L
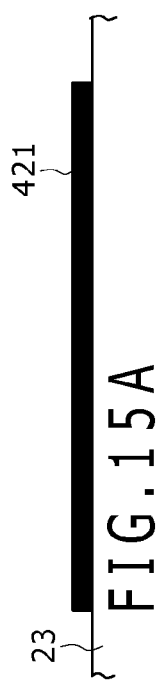
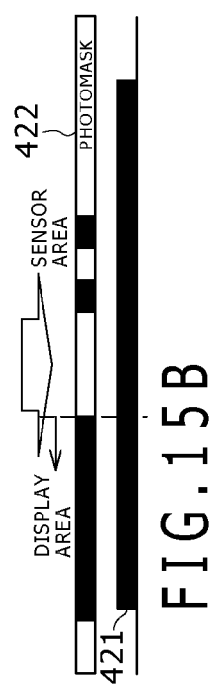
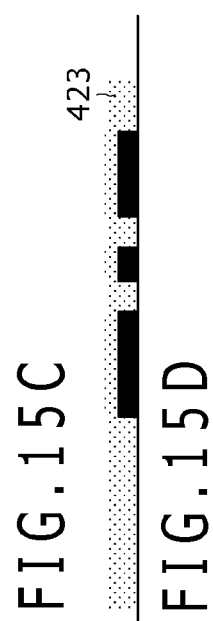
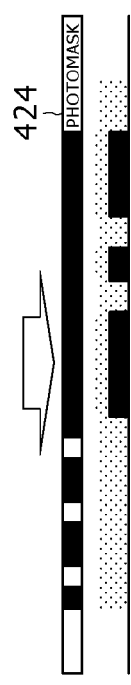
FIG.15A  FIG.15B  FIG.15C  FIG.15D  FIG.15E  FIG.15F

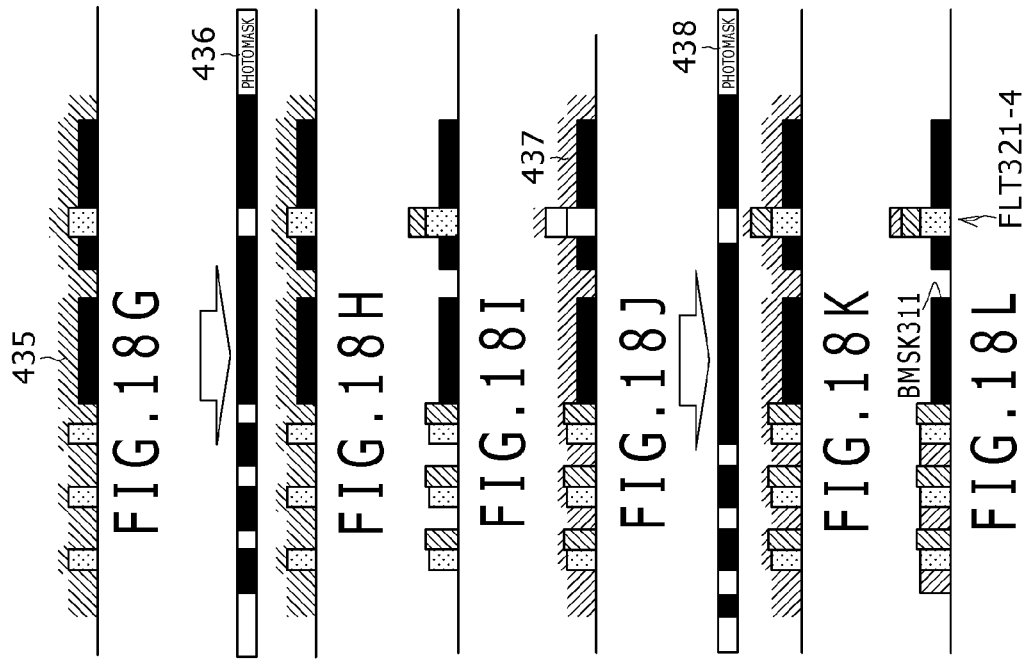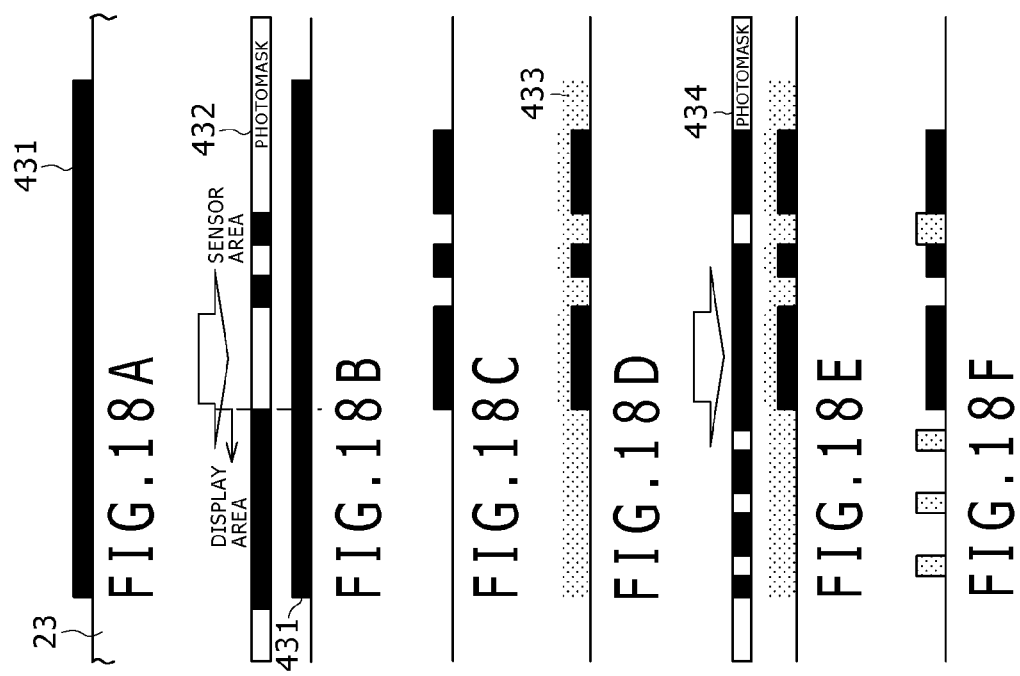

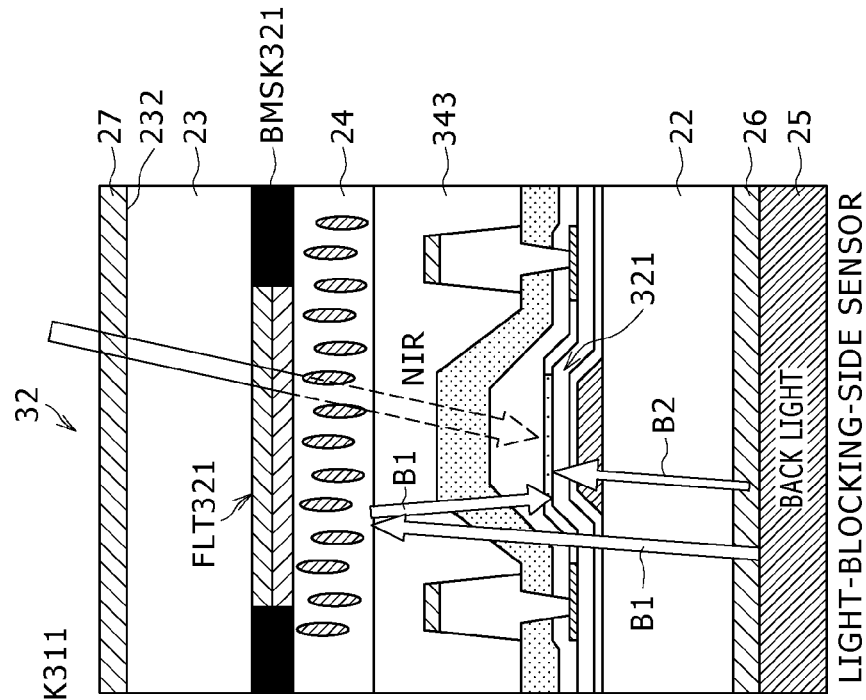
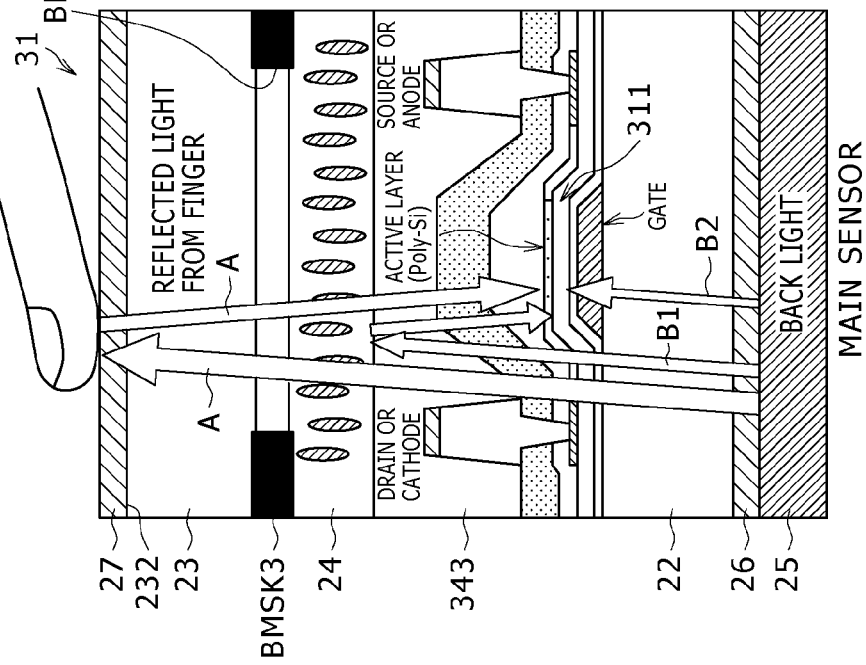

DISPLAY DEVICE AND ELECTRONIC APPARATUS

CROSS REFERENCES TO RELATED PATENTS

The present application claims priority to Japanese Patent Application JP 2007-304341 filed in the Japan Patent Office on Nov. 26, 2007, the entire contents of which is being incorporated herein by reference.

BACKGROUND

The present application relates to a display device that includes a light sensor in a display pixel part or on the frame of the display pixel part, and electronic apparatus.

A technique is known in which the illuminance of ambient light is detected by a photo sensor to thereby increase the screen luminance when the ambient illuminance is high and decrease the screen luminance when the ambient illuminance is low. The visibility of the screen is enhanced by using this technique. In addition, if images are displayed by using a backlight system, such as one in a liquid crystal display device, the power consumption of the backlight system is reduced by this technique, which can contribute to extension of the life of a battery in mobile applications such as cellular phones. Thus, various studies are being made on this kind of technique.

Furthermore, several techniques in which a display device itself is provided with a coordinate input function have been proposed.

Specifically, e.g. display devices based on a pressure-sensitive touch panel system (refer to Japanese Patent Laid-Open No. 2002-149085 and Japanese Patent Laid-Open No. 2002-41244), and display devices based on an electromagnetic-induction touch panel system (refer to Japanese Patent Laid-Open No. Hei 11-134105) are known.

However, these display devices with the coordinate input function involve a problem that size reduction thereof is difficult and the cost thereof is higher than that of general display devices.

To address this problem, in recent years, a display device is being actively developed in which each pixel is provided with a light-receiving element and incident light on the light-receiving element is detected to thereby specify coordinates in the display device (refer to Japanese Patent Laid-Open No. 2004-318067 and Japanese Patent Laid-Open No. 2004-318819).

This device, in which the light-receiving element is provided to thereby allow coordinate input in the display device, has advantages over the display device having the coordinate input function in that size reduction is possible and the cost can also be reduced. In addition, this device allows multiple-coordinate input and area input.

However, as shown in FIG. 1, a photo sensor has sensitivity to the near-infrared region as well as to visible light.

Therefore, the photo sensor detects light in the near-infrared region e.g. under an incandescent light bulb, which provides ambient light involving infrared light. Consequently, even under an environment in which the illuminance is not very high in fact, the photo sensor reacts as if this environment had comparatively-high illuminance, which results in a large error in the evaluation of the ambient illuminance.

Therefore, in order to evaluate merely the illuminance of the visible region, an infrared-cut filter needs to be mounted in front of the sensor separately.

As this infrared-cut filter, a dielectric filter obtained by coating glass with multiple layers of an inorganic film or a filter coated with a dye that absorbs light in the infrared region is used in general.

However, in the case of fabricating the filter on the periphery of the display area of a display device and attaching the filter to the sensor part separately, the filter needs to be mounted with the intermediary of some degree of distance from the display area in order to avoid interference with the display area. This distance leads to an error in measurement of the screen illuminance.

Moreover, because the filter is provided separately, the number of components is increased and the manufacturing process becomes complex, which leads also to cost increase.

If a film such as a polarizer is used for displaying like in a liquid crystal display device, a method would also be available in which the infrared-cut filter is provided integrally with this film to thereby reduce the number of components and dispose the photo sensor close to the display area. However, because the infrared-cut filter itself is colored, the display quality itself is adversely affected, which makes it difficult to employ this method.

In addition, there is a disadvantage that noise of reflected light inside the display device may not be removed in real time in the above-described system and a system for realizing a touch panel, an image sensor, and so on by utilizing light that originates from a backlight and is reflected from a detection subject such as a finger.

Moreover, interference noise from the display part may not be removed in real time in the above-described system based on light from a backlight and an imaging system based on ambient light.

Furthermore, for these reasons, a highly-reliable system that has a favorable temperature characteristic and is robust to temporal variation may not be achieved.

In addition, to achieve the highly-reliable system, calibration operation at the time of power activation is desired.

SUMMARY

In an embodiment, a display device and electronic apparatus are provided that include an infrared filter that can be easily formed without causing increase in the numbers of processes and components, and have suppressed influence of noise and an enhanced SN ratio of a light-reception system without requiring calibration operation at the time of power activation.

According to an embodiment, there is provided a display device including a first light sensor unit configured to include a light-receiving element and detect the intensity of ambient light to a display area, a second light sensor unit configured to include a light-receiving element and be provided with an infrared filter disposed on an optical path to the light-receiving element, and a signal processor configured to execute difference processing for a detection signal of the first light sensor unit and a detection signal of the second light sensor unit. The infrared filter is formed by stacking at least two kinds of color filters.

According to another embodiment, there is provided electronic apparatus having a display device that includes a first light sensor unit configured to include a light-receiving element and detect the intensity of ambient light to a display area, a second light sensor unit configured to include a light-receiving element and be provided with an infrared filter disposed on an optical path to the light-receiving element, and a signal processor configured to execute difference processing for a detection signal of the first light sensor unit and a detection signal of the second light sensor unit. The infrared filter is formed by stacking at least two kinds of color filters.

According to an embodiment, infrared light is detected by the second light sensor unit. Furthermore, difference processing for a detection signal of the first light sensor unit and a detection signal of the second light sensor unit is executed in the signal processor. The signal obtained as the processing result is equivalent to a signal resulting from extreme suppression of the influence of reflection noise, dark current arising when light is blocked, leakage current due to sensitivity to the near-infrared region, and offset noise in the first light sensor unit.

According to an embodiment, the infrared filter can be easily formed without causing increase in the numbers of processes and components. In addition, the influence of noise can be suppressed and the SN ratio of a light-reception system can be enhanced without requiring calibration operation at the time of power activation.

Additional features and advantages are described herein, and will be apparent from the following Detailed Description and the figures.

BRIEF DESCRIPTION OF THE FIGURES

FIGS. 15A to 15L are diagrams showing a manufacturing process for the filter of FIG. 13;

FIGS. 18A to 18L are diagrams showing a manufacturing process for the filter of FIG. 16;

FIGS. 29A and 29B are diagrams for explaining the reason why noise can be removed through difference signal processing for output signals of a first light sensor unit and a second light sensor unit according to an embodiment;

DETAILED DESCRIPTION

Figure 1:
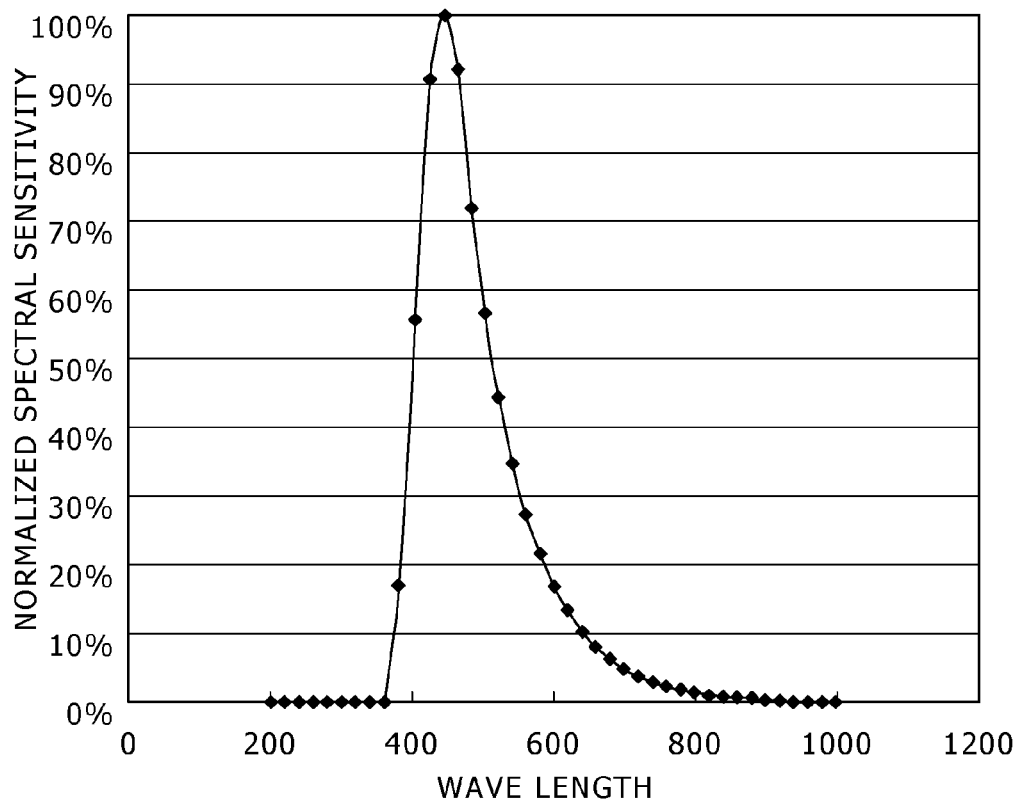
FIG. 1 is a diagram showing an element characteristic of a light sensor.
Figure 2:
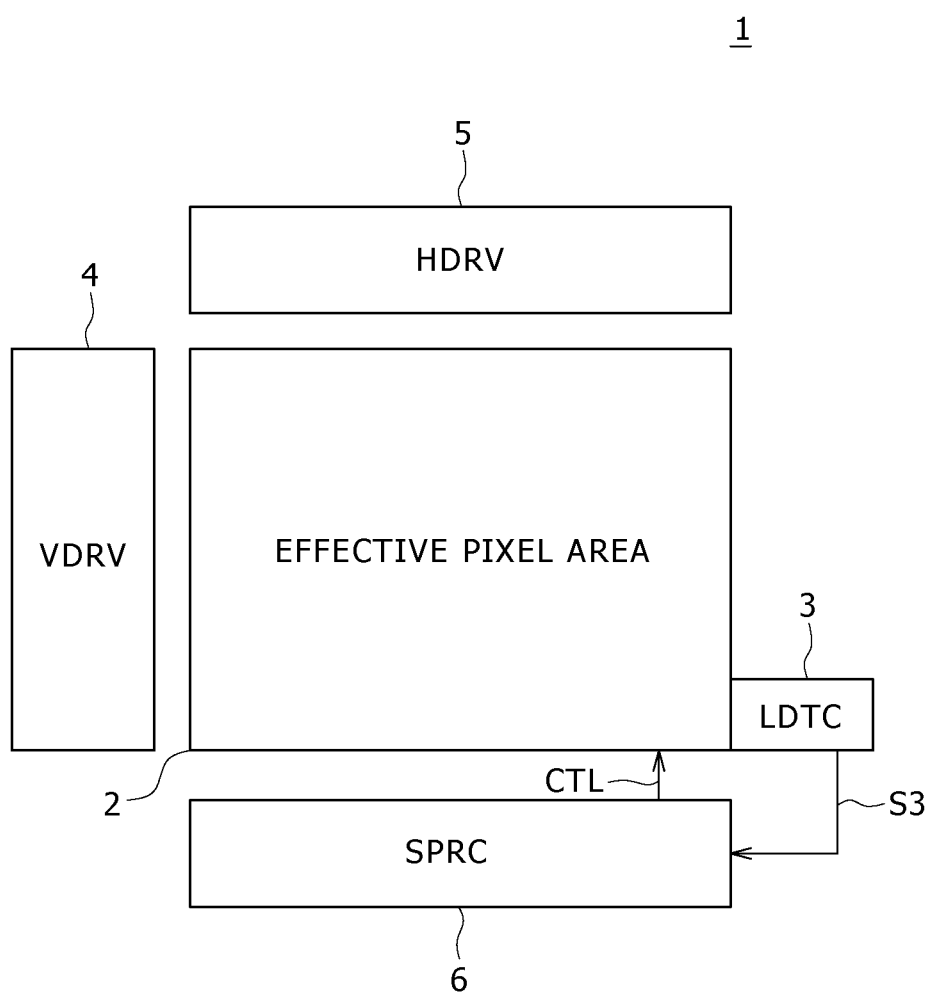
FIG. 2 is a block diagram showing a configuration example of a liquid crystal display device according to a first embodiment.

Embodiments of the present application will be described below with reference to the accompanying drawings.
<First Embodiment>
FIG. 2 is a block diagram showing a configuration example of a liquid crystal display device according to a first embodiment.

Figure 3A:
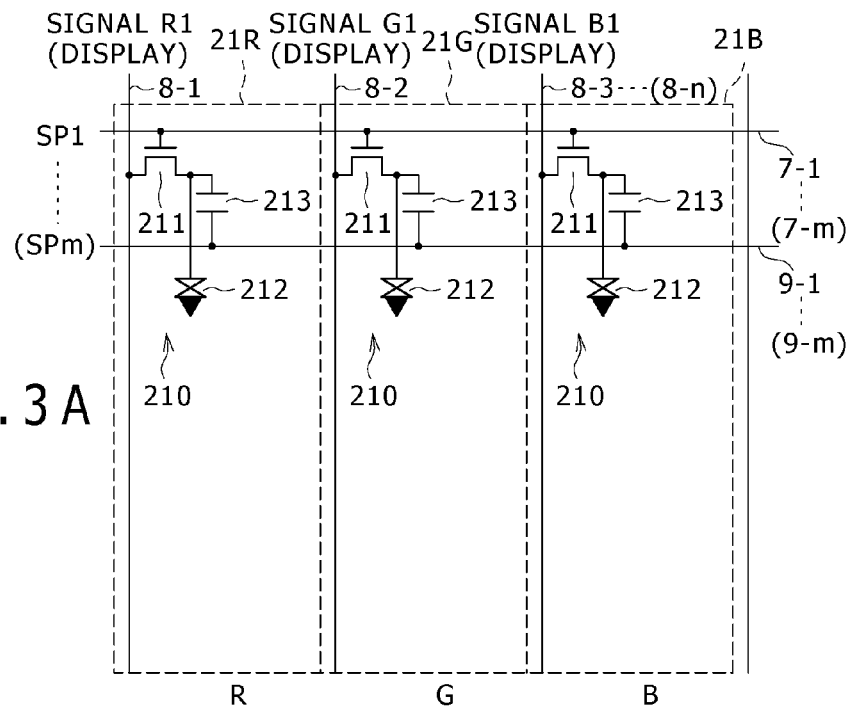
FIGS. 3A to 3C are diagrams showing a configuration example of an effective pixel area unit in the liquid crystal display device of FIG. 2.
Figure 3B:
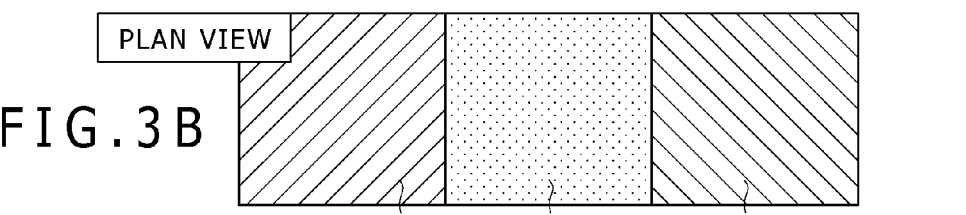
Figure 3C:
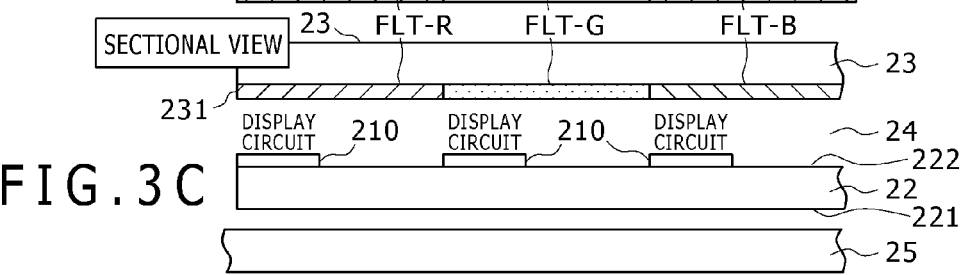

FIGS. 3A to 3C are diagrams showing a configuration example of the effective display area unit in the liquid crystal display device of FIG. 2: FIG. 3A shows the matrix arrangement of cells, FIG. 3B is a plan view, and FIG. 3C is a sectional view.

Figure 4:
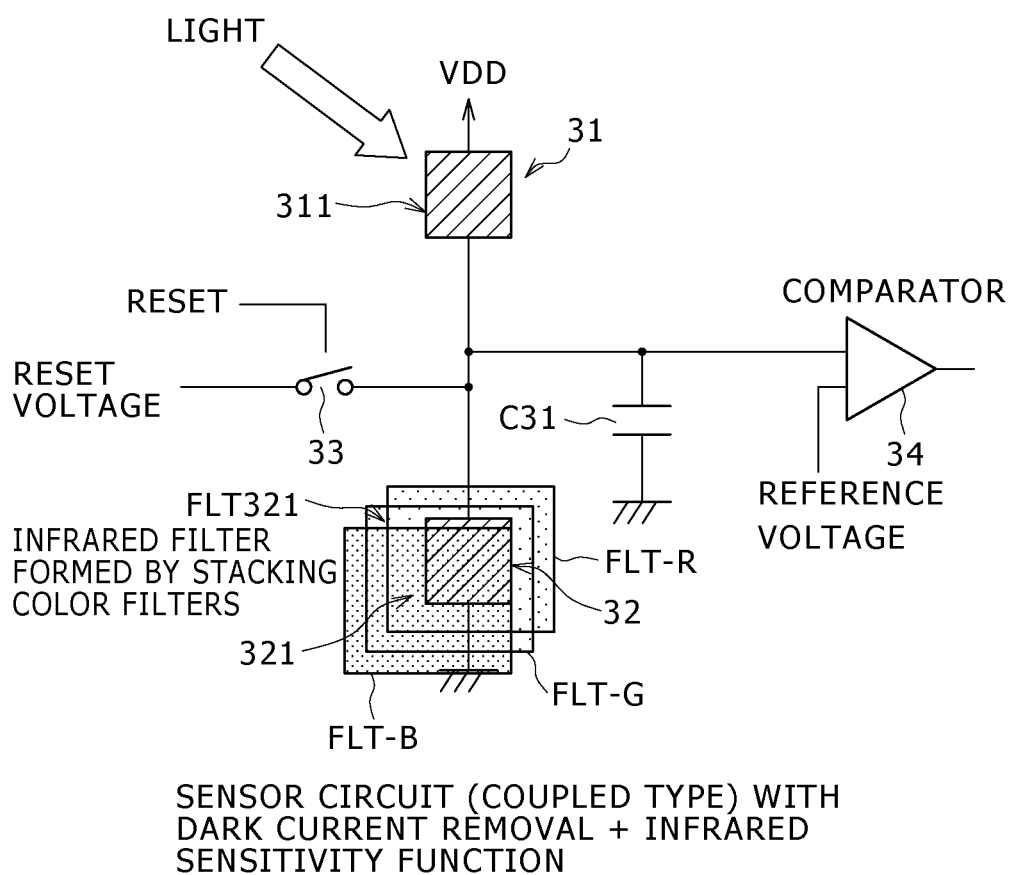
FIG. 4 is a circuit diagram showing a configuration example of a light detector according to the first embodiment.

FIG. 4 is a diagram showing a configuration example of a light detection circuit according to the present embodiment.

As shown in FIG. 2, a liquid crystal display device 1 includes an effective display area unit (image display part) 2 as a display unit, a light detector (LDTC) 3, a vertical drive circuit (VDRV) 4, a horizontal drive circuit (HDRV) 5, and a signal processing circuit (SPRC) 6.

The liquid crystal display device 1 of the present embodiment is configured to be capable of changing the surface luminance of the effective display area unit 2 (in fact, be capable of changing the light-emission intensity of a backlight 25) depending on the intensity (illuminance) of ambient light. That is, the liquid crystal display device 1 of the present embodiment has a light-dimming function.

In the effective display area unit 2, plural display cells 21 each serving as a display pixel and each including a display circuit 210 are arranged in a matrix. The effective display area unit 2 serves as a display screen.

The light detector 3 is disposed adjacent to (close to) the effective display area unit 2.

It is also possible to form the light detector 3 integrally with the effective display area unit 2 as described later for a second embodiment, instead of forming it outside the effective display area unit 2 (in the non-display area outside the effective area of the display area unit) adjacent to the effective display area unit 2.

As shown in FIG. 4, the light detector 3 has a first light sensor unit 31, a second light sensor unit 32, a reset switch 33, a comparator 34, and a capacitor C31.

The first light sensor unit 31 includes a light-receiving element (photo sensor, light-dimming-side sensor) 311, and detects the intensity of ambient light to the effective display area unit 2.

The second light sensor unit 32 includes a light-receiving element 321. An infrared filter FLT321 is disposed on the optical path to this light-receiving element 321 so that dark current arising when light is blocked and leakage current due to sensitivity to the near-infrared region can be detected.

This infrared filter FLT321 is formed by stacking at least two kinds of color filters as described in detail later. More specifically, the infrared filter FLT321 is formed by stacking at least two of color filters of red (R), green (G), and blue (B) as three primary colors, and has any of a multilayer structure composed of a red color filter FLT-R and a blue color filter FLT-B, a multilayer structure composed of the red color filter FLT-R and a green color filter FLT-G, and a multilayer structure composed of the red color filter FLT-R, the green color filter FLT-G, and the blue color filter FLT-B.

The first light sensor unit 31 and the second light sensor unit 32 are disposed in an area over which a light-blocking object (e.g. a finger of a user) is not held, and in which ambient light can be received and the ambient light level can be detected.

In the light detector 3 of FIG. 4, the light-dimming-side sensor (light-receiving element 311) of the first light sensor unit 31 and the light-blocking-side sensor (light-receiving element 321) of the second light sensor unit 32 are connected in series to each other close to (in proximity to) each other between a supply potential VDD and a reference potential VSS (e.g. ground potential GND).

By using the comparator 34, the light detector 3 compares the reference voltage with a signal resulting from subtraction of the infrared component obtained as the current component detected by the light-blocking-side sensor (light-receiving element 321) of the second light sensor unit 32 from the current component detected by the light-dimming-side sensor (light-receiving element 311) of the first light sensor unit 31. As a result, the light detector 3 obtains an external-light intensity signal and outputs it as a detection signal S3 to the signal processing circuit 6.

The detection signal S3 by the light detector 3 results from the removal of the infrared-region component detected by the light-dimming-side sensor (light-receiving element 311).

As above, the light detector 3 has a function as a signal processor that executes difference processing for the detection signal of the first light sensor unit and the detection signal of the second light sensor unit.

The signal processing circuit 6 controls the amount of the light supplied to the effective display area unit 2 depending on the detection signal S3 by the light detector 3.

In the present embodiment, the signal processing circuit 6 changes the surface luminance of the effective display area unit (screen display part) 2 based on a control signal CTL depending on the output level of the detection signal S3 of the light detector 3.

The effective display area unit 2 will be described in further detail below.

For example, in a predetermined area of the effective display area unit 2, a red display cell 21R, a green display cell 21G, and a blue display cell 21B corresponding to three primary colors are arranged in that order from the left side of FIG. 3. This arrangement is repeated with or without the intermediary of e.g. a light-blocking mask (black mask) (not shown).

Furthermore, as shown in FIG. 3B, in the effective display area unit 2, the red filter FLT-R, the green filter FLT-G, and the blue filter FLT-B are formed in the arrangement areas of the red display cell 21R, the green display cell 21G, and the blue display cell 21B, respectively.

In the effective display area unit 2, as shown in FIG. 3C, a liquid crystal layer 24 is formed and enclosed between a TFT substrate (first transparent substrate) 22 composed of e.g. glass and a counter substrate (second transparent substrate) 23. The backlight 25 is disposed near a bottom surface 221 of the TFT substrate 22 for example.

The display circuits 210 of the respective display cells 21 are formed on a substrate surface 222 of the TFT substrate 22.

On the other hand, the filters FLT-R, FLT-G, and FLT-B are formed on a substrate surface 231 of the counter substrate 23.

As shown in FIG. 3A, the display circuit 210 in each display cell 21 is composed of a thin film transistor (TFT) 211 as a switching element, a liquid crystal cell (LC) 212 whose pixel electrode is connected to the drain electrode (or the source electrode) of the TFT 211, and a holding capacitor (Cs) 213 whose one electrode is connected to the drain electrode of the TFT 211.

For the respective display cells 21, scan lines (gate lines) 7-1 to 7-m are disposed along the pixel arrangement direction on a row-by-row basis, and display signal lines 8-1 to 8-n are disposed along the pixel arrangement direction on a column-by-column basis.

The gate electrodes of the TFTs 211 of the respective display cells 21 on the same row are connected to the same scan line (gate line) of the scan lines 7-1 to 7-m. The source electrodes (or the drain electrodes) of the TFTs 211 of the respective display cells 21 on the same column are connected to the same display signal line of the display signal lines 8-1 to 8-n.

In the configuration of FIG. 3A, the scan lines 7-1 to 7-m are connected to the vertical drive circuit 4 and are driven by this vertical drive circuit 4.

The display signal lines 8-1 to 8-n disposed corresponding to the display cells 21 are connected to the horizontal drive circuit 5 and are driven by this horizontal drive circuit 5.

In addition, in a general liquid crystal display device, pixel holding capacitor interconnects (Cs) 9-1 to 9-m are independently disposed, and the holding capacitors 213 are formed between the pixel holding capacitor interconnects 9-1 to 9-m and the connecting electrodes.

Furthermore, e.g. a predetermined DC voltage is applied as a common voltage VCOM to the counter electrode of the liquid crystal cell 212 and/or the other electrode of the holding capacitor 213 in the display cell 21 of each pixel part via a common interconnect.

Alternatively, the common voltage VCOM whose polarity is inverted every one horizontal scanning period (1H) is applied to the counter electrode of the liquid crystal cell 212 and the other electrode of the holding capacitor 213 in each display cell 21.

The vertical drive circuit 4 receives a vertical start signal VST, a vertical clock VCK, and an enable signal ENB generated by a clock generator (not shown), and executes processing of carrying out scanning in the vertical direction (row direction) every one-field period to thereby sequentially select the respective display cells 21 connected to the scan lines 7-1 to 7-m on a row-by-row basis.

Specifically, the pixels of the respective columns on the first row are selected when a scan pulse SP1 is given from the vertical drive circuit 4 to the scan line 7-1, and the pixels of the respective columns on the second row are selected when a scan pulse SP2 is given to the scan line 7-2. Similarly, scan pulses SP3, . . . , SPm are sequentially given to the scan lines 7-3, . . . , 7-m.

The horizontal drive circuit 5 produces a sampling pulse through reception of a horizontal start pulse HST and a horizontal clock HCK generated by the clock generator (not shown). The horizontal start pulse HST indicates the start of horizontal scanning, and the horizontal clock HCK serves as the basis of the horizontal scanning and has phases opposite to each other. The horizontal drive circuit 5 sequentially samples input image data R (red), G (green), and B (blue) in response to the produced sampling pulse, and supplies the sampled image data to the respective display signal lines 8-1 to 8-n as data signals to be written to the respective display cells 21.

The configurations of the first sensor unit 31 and the second sensor unit 32 in the light detector 3 will be described in further detail below.

Figure 5:
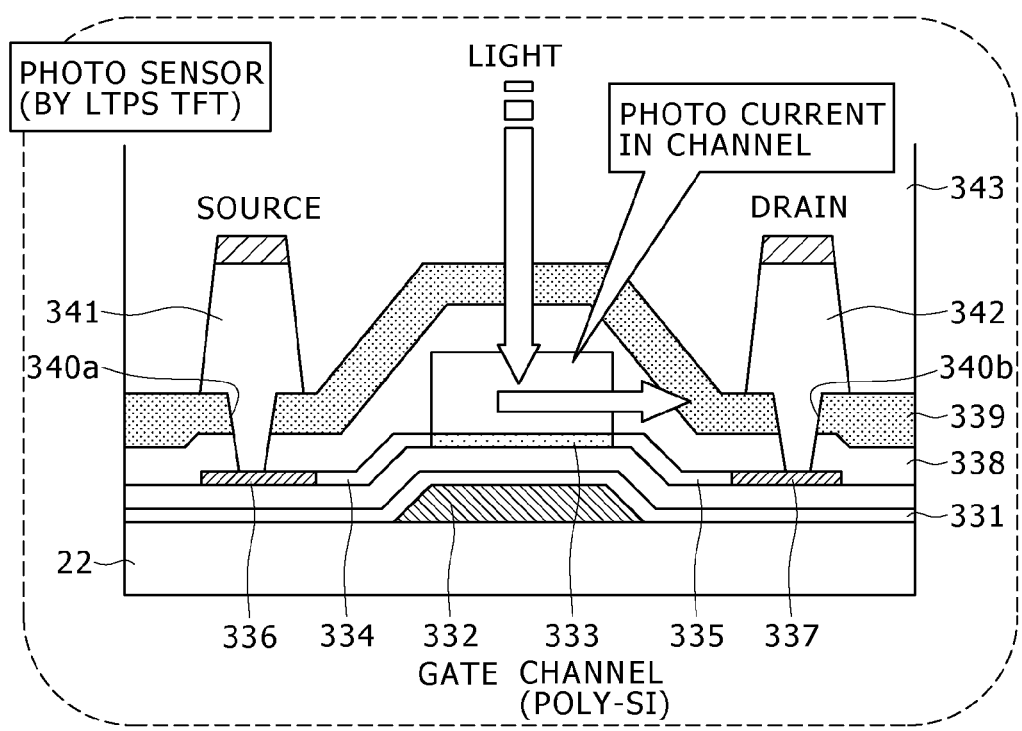
FIG. 5 is a sectional view showing a structural example in which a photo sensor (light-receiving element) of a first light sensor unit and a second light sensor unit is formed by a TFT.

FIG. 5 is a sectional view showing a structural example in which a photo sensor (light-receiving element) of the first light sensor unit and the second light sensor unit is formed by a TFT.

On the TFT substrate 22 (transparent insulating substrate, e.g. glass substrate), a gate electrode 332 covered by a gate insulating film 331 is formed. The gate electrode is formed by depositing a metal such as molybdenum (Mo) or tantalum (Ta) or an alloy by sputtering or the like.

A semiconductor film (channel forming region) 333 is formed over the gate insulating film 331. A pair of n− diffusion layers (LDD regions) 334 and 335 and a pair of n+ diffusion layers (source and drain regions) 336 and 337 are so formed as to sandwich the semiconductor film 333 therebetween. An interlayer insulating film 338 is so formed as to cover the gate insulating film 331, the semiconductor layer (channel forming region) 333, the n− diffusion layers (LDD regions) 334 and 335, and the n+ diffusion layers (source and drain regions) 336 and 337. An interlayer insulating film 339 is so formed as to cover the interlayer insulating film 338. The interlayer insulating film 339 is composed of e.g. SiN or SiO2.

A source electrode 341 is connected to one n+ diffusion layer 336 via a contact hole 340a formed in the interlayer insulating films 338 and 339. A drain electrode 342 is connected to the other n+ diffusion layer 337 via a contact hole 340b formed in the interlayer insulating films 338 and 339.

The source electrode 341 and the drain electrode 342 are formed by patterning e.g. aluminum (Al).

A planarization film 343 is formed over the interlayer insulating film 338, the source electrode 341, the drain electrode 342, and the interlayer insulating film 339.

In the case of disposing the liquid crystal layer 24 on the effective display area of the display area unit or the non-display area for example, the liquid crystal layer 24 is formed on the planarization film 343.

In the present embodiment, the infrared filter FLT321 formed of a multilayer structure of the color filters is formed in an aperture formed in a black mask BMSK of the second light sensor unit 32 for example.

A configuration example and a fabrication method of the infrared filter FLT321 according to the present embodiment will be described below in association with drawings.

Figure 6:
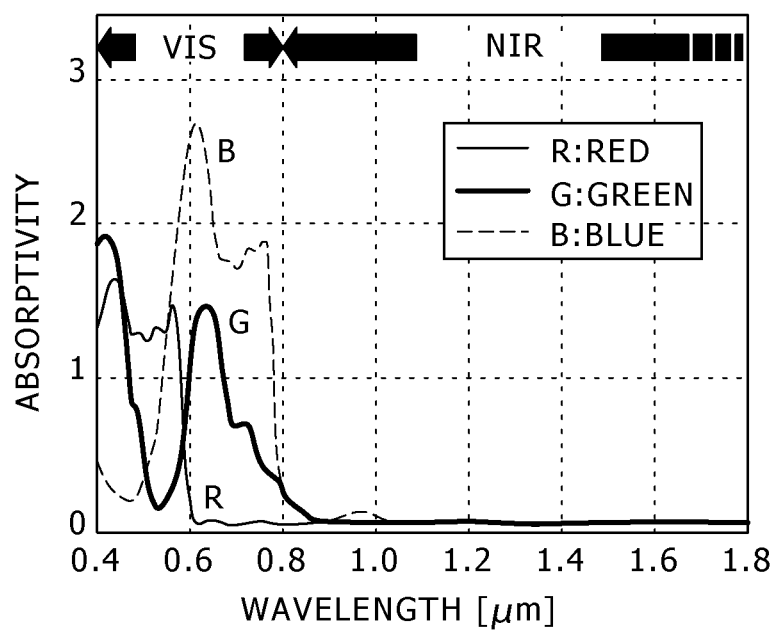
FIG. 6 is a diagram showing the absorption spectra of the visible region and the infrared region of a red color filter, a green color filter, and a blue color filter.

FIG. 6 shows the absorption spectra of the visible region (VIS) and the infrared region NIR of the respective color filters CF, the red filter FLT-R, the green filter FLT-G, and the blue filter FLT-B.

In FIG. 6, the abscissa indicates the wavelength and the ordinate indicates the absorptivity.

Figure 7:
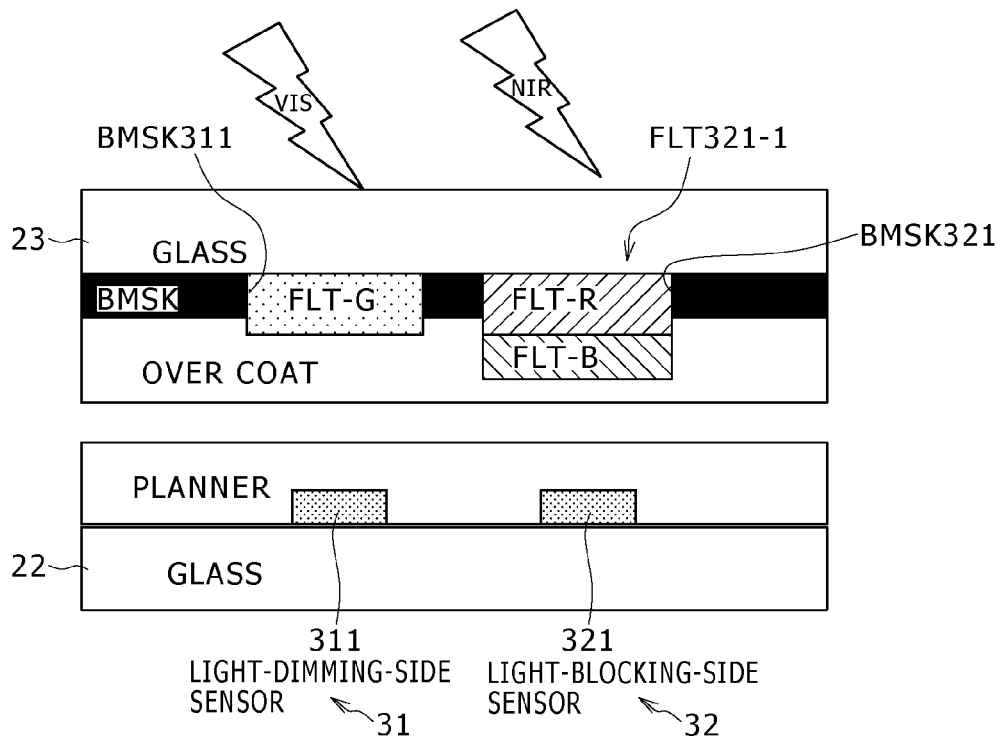
FIG. 7 is a diagram showing a first configuration example of an infrared filter.

FIG. 7 is a diagram showing a first configuration example of the infrared filter.

Figure 8:
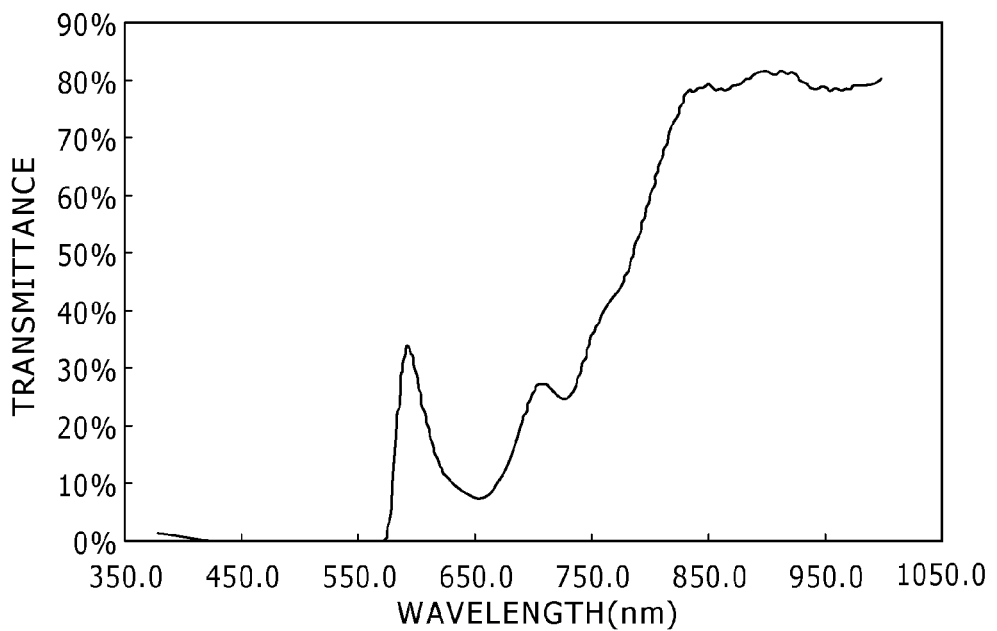
FIG. 8 is a diagram showing the spectral characteristic of the infrared filter of FIG. 7.

FIG. 8 is a diagram showing the spectral characteristic of the infrared filter of FIG. 7.

In FIG. 8, the abscissa indicates the wavelength and the ordinate indicates the transmittance.

An infrared filter FLT321-1 of FIG. 7 is formed by stacking two color filters of the red filter FLT-R and the blue filter FLT-B in an aperture BMSK321 of the black mask BMSK.

This infrared filter FLT321-1 has a favorable transmissive characteristic with respect to the infrared region as shown in FIG. 8.

In the example of FIG. 7, one green filter FLT-G is formed in an aperture BMSK311 of the black mask BMSK of the first light sensor unit 31 so that visible light may be guided to the light-receiving element (photo sensor) 311 favorably. It is also possible that this green filter FLT-G for the first light sensor unit 31 is absent.

FIGS. 9A to 9L are diagrams showing a manufacturing process of the filters of FIG. 7.

Figure 9:
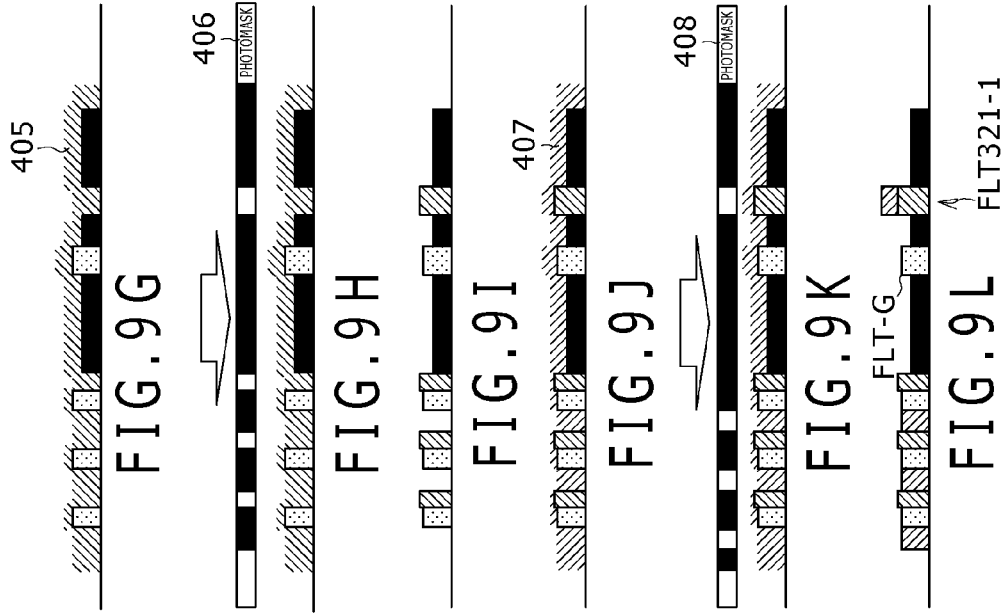
FIGS. 9A to 9L are diagrams showing a manufacturing process for the filters of FIG. 7.

Initially, as shown in FIG. 9A, a black photosensitive resist 401 is applied on the glass substrate (counter substrate) 23.

Next, as shown in FIG. 9B, a photomask 402 is formed over the black photosensitive resist 401, and the black photosensitive resist 401 is selectively exposed.

Subsequently, as shown in FIG. 9C, the black pattern is developed.

Next, as shown in FIG. 9D, a green photosensitive resist 403 is applied.

As shown in FIG. 9E, a photomask 404 is formed over the green photosensitive resist 403, and the green photosensitive resist 403 is selectively exposed.

Subsequently, as shown in FIG. 9F, the green pattern is developed.

Next, as shown in FIG. 9G, a red photosensitive resist 405 is applied.

As shown in FIG. 9H, a photomask 406 is formed over the red photosensitive resist 405, and the red photosensitive resist 405 is selectively exposed.

Subsequently, as shown in FIG. 9I, the red pattern is developed.

Next, as shown in FIG. 9J, a blue photosensitive resist 407 is applied.

As shown in FIG. 9K, a photomask 408 is formed over the blue photosensitive resist 407, and the blue photosensitive resist 407 is selectively exposed.

Figure 12:
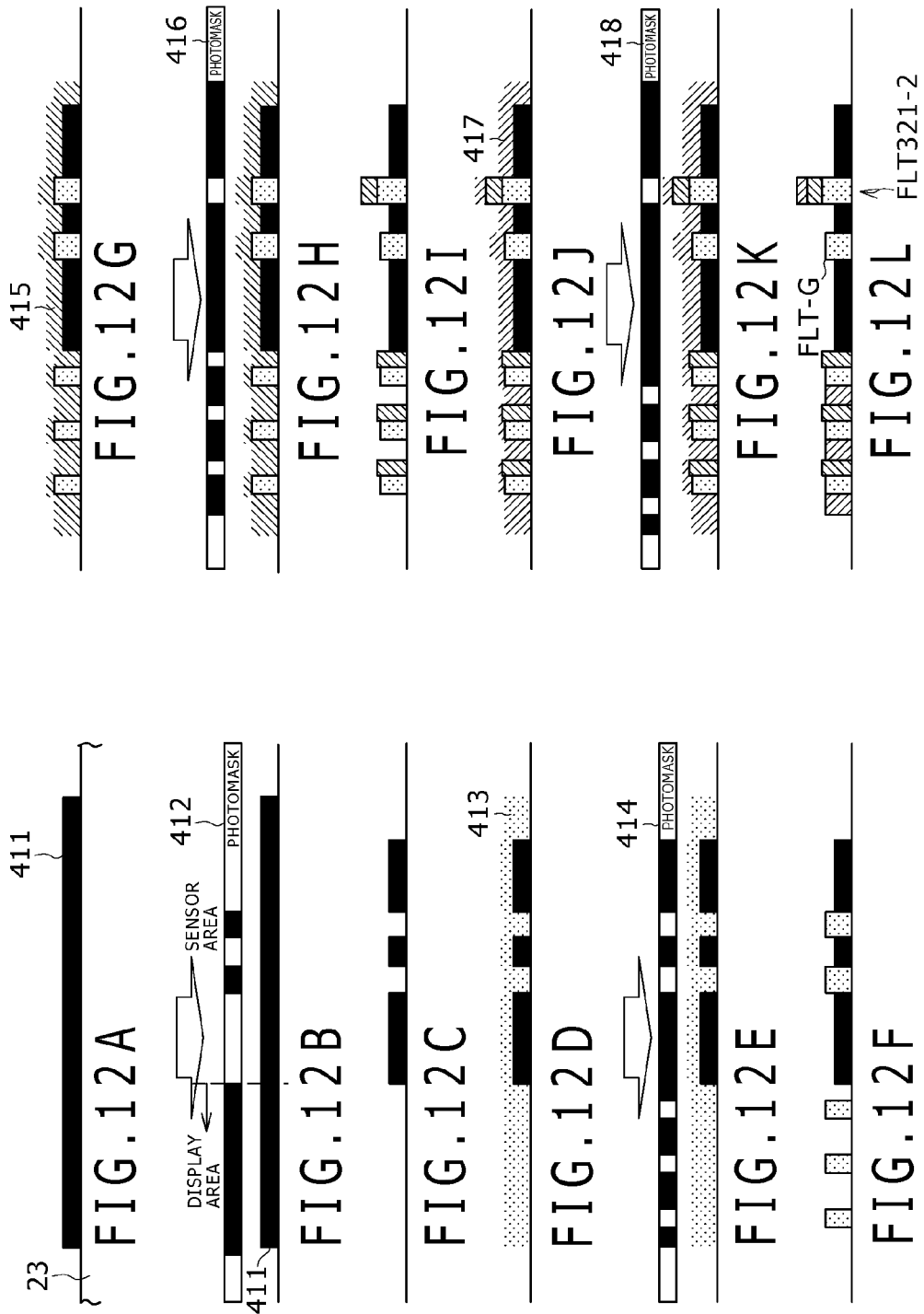
FIGS. 12A to 12L are diagrams showing a manufacturing process for the filters of FIG. 10.

Subsequently, as shown in FIG. 12L, the blue pattern is developed.

Through the above-described manufacturing process, the infrared filter FLT321-1 of the second light sensor unit 32 and the green filter FLT-G of the first light sensor unit 31 are formed.

Figure 10:
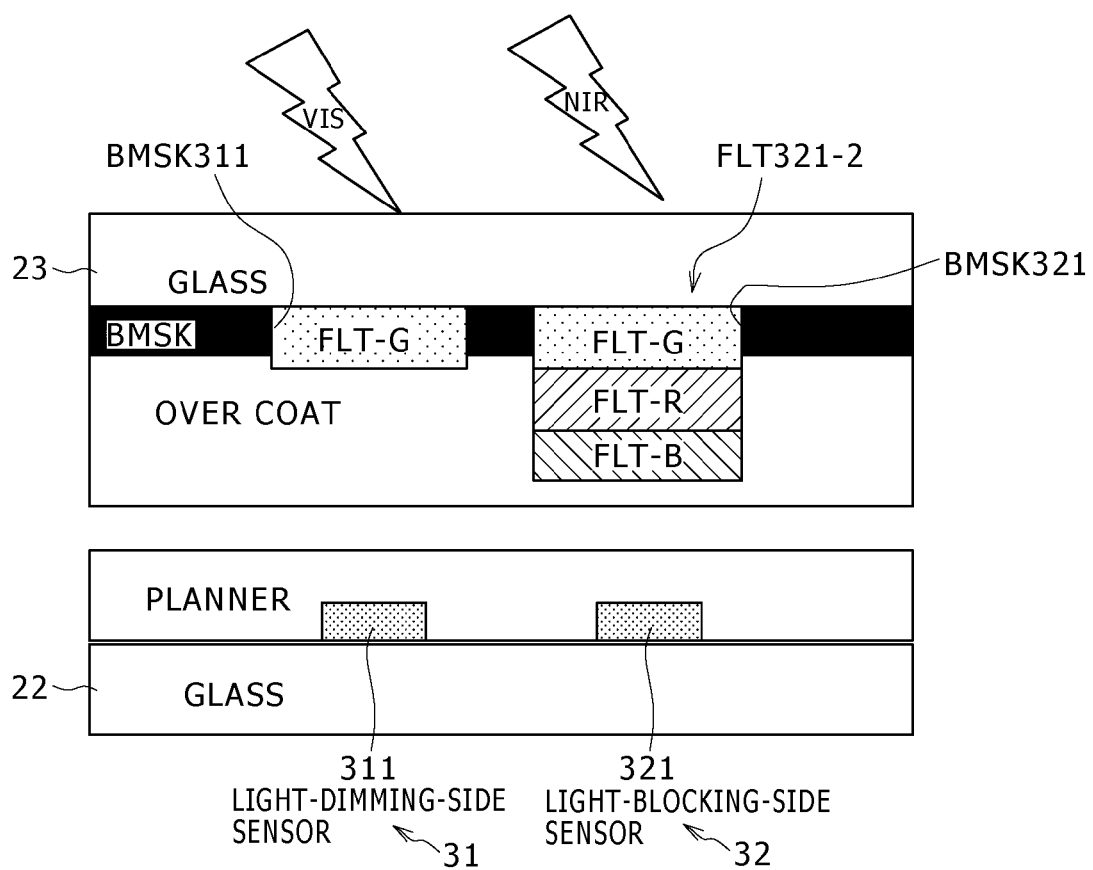
FIG. 10 is a diagram showing a second configuration example of the infrared filter.

FIG. 10 is a diagram showing a second configuration example of the infrared filter.

Figure 11:
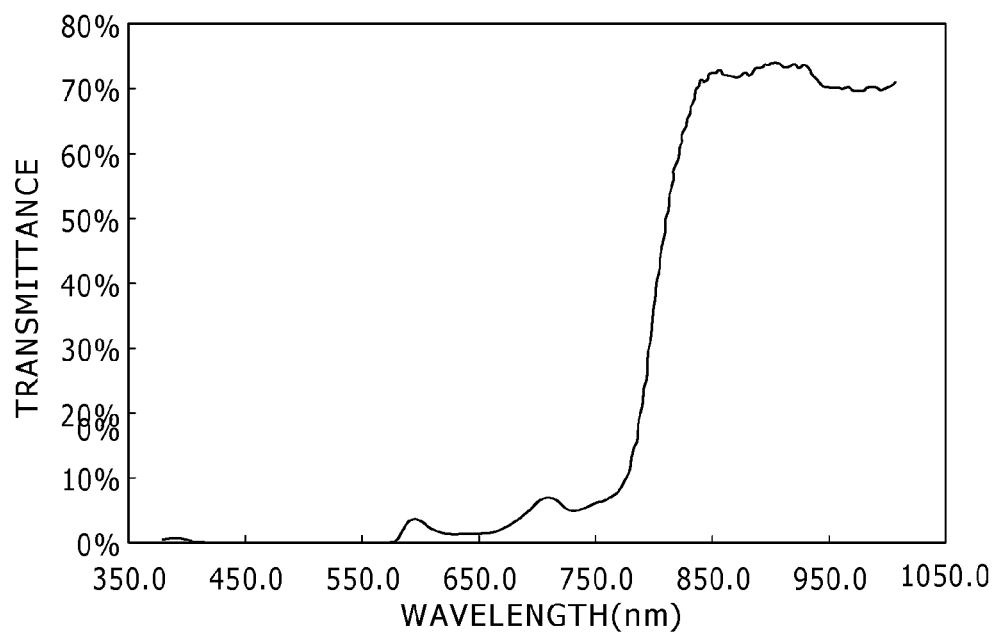
FIG. 11 is a diagram showing the spectral characteristic of the infrared filter of FIG. 10.

FIG. 11 is a diagram showing the spectral characteristic of the infrared filter of FIG. 10.

In FIG. 11, the abscissa indicates the wavelength and the ordinate indicates the transmittance.

An infrared filter FLT321-2 of FIG. 10 is formed by stacking three color filters of the green filter FLT-G, the red filter FLT-R, and the blue filter FLT-B in the aperture BMSK321 of the black mask BMSK.

This infrared filter FLT321-2 has a favorable transmissive characteristic with respect to the infrared region as shown in FIG. 11.

In the example of FIG. 10, one green filter FLT-G is formed in the aperture BMSK311 of the black mask BMSK of the first light sensor unit 31 so that visible light may be guided to the light-receiving element (photo sensor) 311 favorably, similarly to the example of FIG. 7. It is also possible that this green filter FLT-G for the first light sensor unit 31 is absent.

FIGS. 12A to 12L are diagrams showing a manufacturing process of the filters of FIG. 10.

Initially, as shown in FIG. 12A, a black photosensitive resist 411 is applied on the glass substrate (counter substrate) 23.

Next, as shown in FIG. 12B, a photomask 412 is formed over the black photosensitive resist 411, and the black photosensitive resist 411 is selectively exposed.

Subsequently, as shown in FIG. 12C, the black pattern is developed.

Next, as shown in FIG. 12D, a green photosensitive resist 413 is applied.

As shown in FIG. 12E, a photomask 414 is formed over the green photosensitive resist 413, and the green photosensitive resist 413 is selectively exposed.

Subsequently, as shown in FIG. 12F, the green pattern is developed.

Next, as shown in FIG. 12G, a red photosensitive resist 415 is applied.

As shown in FIG. 12H, a photomask 416 is formed over the red photosensitive resist 415, and the red photosensitive resist 415 is selectively exposed.

Subsequently, as shown in FIG. 12I, the red pattern is developed.

Next, as shown in FIG. 12J, a blue photosensitive resist 417 is applied.

As shown in FIG. 12K, a photomask 418 is formed over the blue photosensitive resist 417, and the blue photosensitive resist 417 is selectively exposed.

Subsequently, as shown in FIG. 12L, the blue pattern is developed.

Through the above-described manufacturing process, the infrared filter FLT321-2 of the second light sensor unit 32 and the green filter FLT-G of the first light sensor unit 31 are formed.

Figure 13:
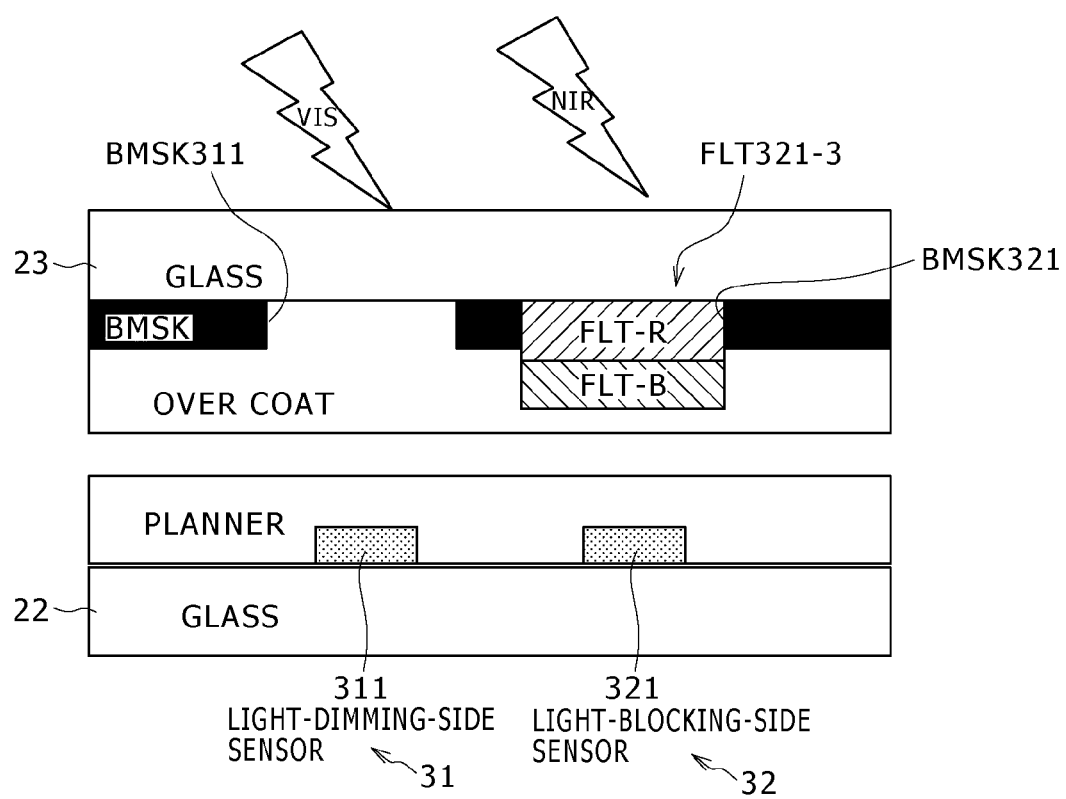
FIG. 13 is a diagram showing a third configuration example of the infrared filter.

FIG. 13 is a diagram showing a third configuration example of the infrared filter.

Figure 14:
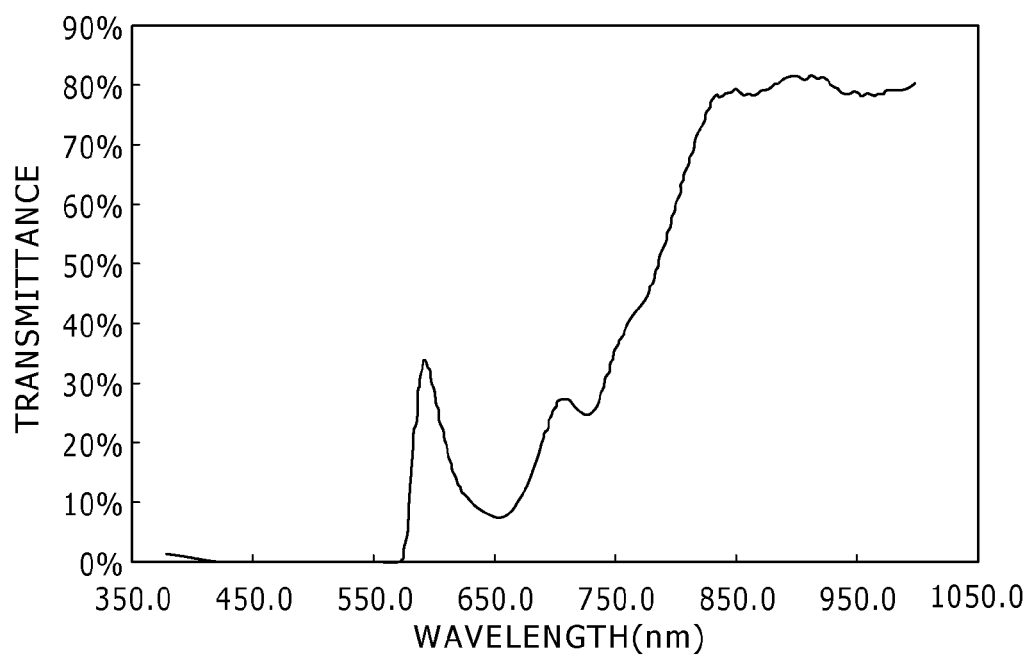
FIG. 14 is a diagram showing the spectral characteristic of the infrared filter of FIG. 13.

FIG. 14 is a diagram showing the spectral characteristic of the infrared filter of FIG. 13.

In FIG. 14, the abscissa indicates the wavelength and the ordinate indicates the transmittance.

An infrared filter FLT321-3 of FIG. 13 is formed by stacking two color filters of the red filter FLT-R and the blue filter FLT-B in the aperture BMSK321 of the black mask BMSK, similarly to the first configuration example of FIG. 7.

This infrared filter FLT321-3 has a favorable transmissive characteristic with respect to the infrared region as shown in FIG. 14.

In the example of FIG. 13, the green filter FLT-G is not formed in the aperture BMSK311 of the black mask BMSK of the first light sensor unit 31 unlike the example of FIG. 7.

FIGS. 15A to 15L are diagrams showing a manufacturing process of the filter of FIG. 13.

Initially, as shown in FIG. 15A, a black photosensitive resist 421 is applied on the glass substrate (counter substrate) 23.

Next, as shown in FIG. 15B, a photomask 422 is formed over the black photosensitive resist 421, and the black photosensitive resist 421 is selectively exposed.

Subsequently, as shown in FIG. 15C, the black pattern is developed.

Next, as shown in FIG. 15D, a green photosensitive resist 423 is applied.

As shown in FIG. 15E, a photomask 424 is formed over the green photosensitive resist 423, and the green photosensitive resist 423 is selectively exposed.

Subsequently, as shown in FIG. 15F, the green pattern is developed.

Next, as shown in FIG. 15G, a red photosensitive resist 425 is applied.

As shown in FIG. 15H, a photomask 426 is formed over the red photosensitive resist 425, and the red photosensitive resist 425 is selectively exposed.

Subsequently, as shown in FIG. 15S, the red pattern is developed.

Next, as shown in FIG. 15J, a blue photosensitive resist 427 is applied.

As shown in FIG. 15K, a photomask 428 is formed over the blue photosensitive resist 427, and the blue photosensitive resist 427 is selectively exposed.

Subsequently, as shown in FIG. 15L, the blue pattern is developed.

Through the above-described manufacturing process, the infrared filter FLT321-3 of the second light sensor unit 32 and the aperture BMSK311 of the first light sensor unit 31 are formed.

Figure 16:
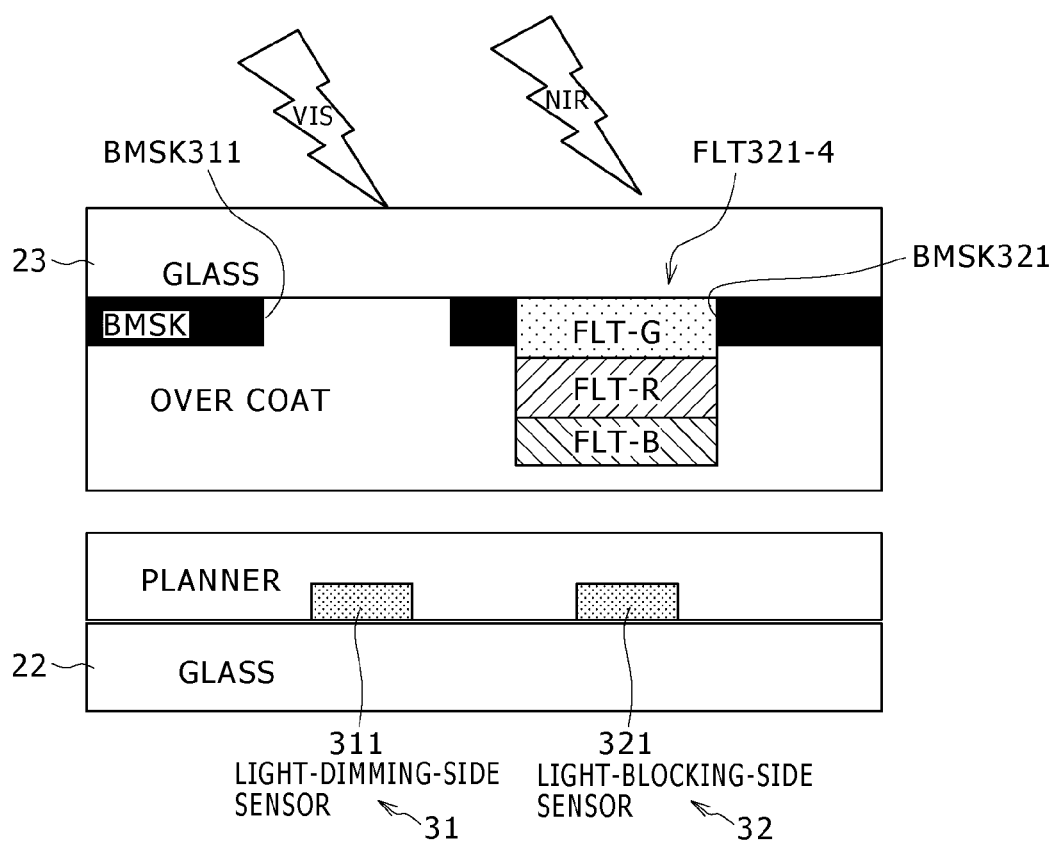
FIG. 16 is a diagram showing a fourth configuration example of the infrared filter.

FIG. 16 is a diagram showing a fourth configuration example of the infrared filter.

Figure 17:
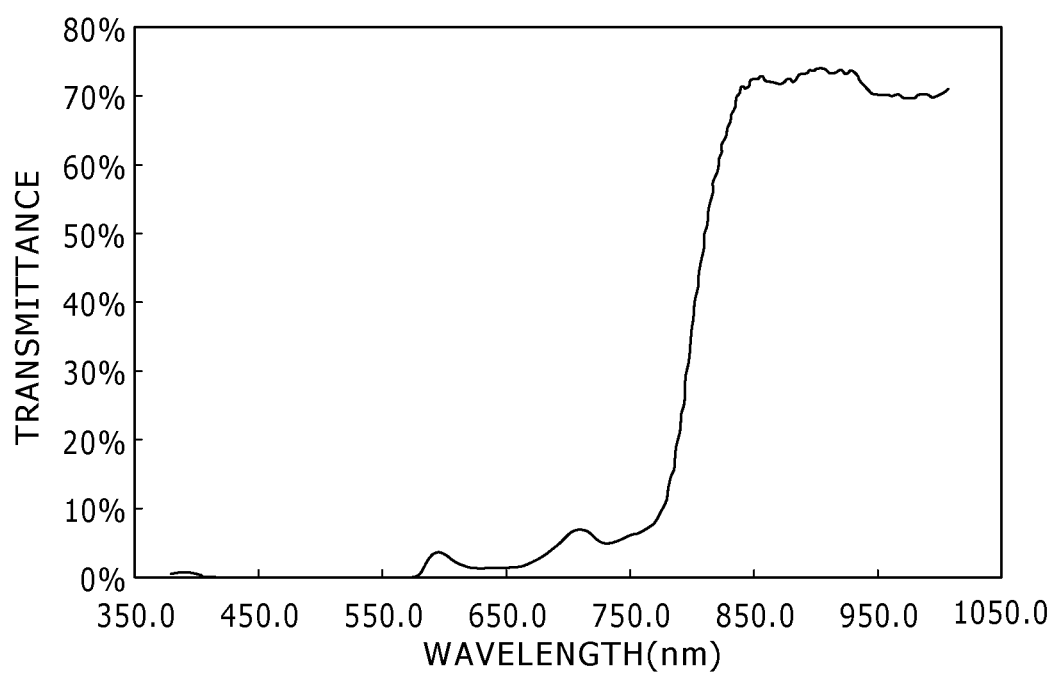
FIG. 17 is a diagram showing the spectral characteristic of the infrared filter of FIG. 16.

FIG. 17 is a diagram showing the spectral characteristic of the infrared filter of FIG. 16.

In FIG. 17, the abscissa indicates the wavelength and the ordinate indicates the transmittance.

An infrared filter FLT321-4 of FIG. 16 is formed by stacking three color filters of the green filter FLT-G, the red filter FLT-R, and the blue filter FLT-B in the aperture BMSK321 of the black mask BMSK, similarly to the second configuration example of FIG. 10.

This infrared filter FLT321-4 has a favorable transmissive characteristic with respect to the infrared region as shown in FIG. 17.

In the example of FIG. 16, the green filter FLT-G is not formed in the aperture BMSK311 of the black mask BMSK of the first light sensor unit 31 unlike the example of FIG. 10.

FIGS. 18A to 18L are diagrams showing a manufacturing process of the filter of FIG. 16.

Initially, as shown in FIG. 18A, a black photosensitive resist 431 is applied on the glass substrate (counter substrate) 23.

Next, as shown in FIG. 18B, a photomask 432 is formed over the black photosensitive resist 431, and the black photosensitive resist 431 is selectively exposed.

Subsequently, as shown in FIG. 18C, the black pattern is developed.

Next, as shown in FIG. 18D, a green photosensitive resist 433 is applied.

As shown in FIG. 18E, a photomask 434 is formed over the green photosensitive resist 433, and the green photosensitive resist 433 is selectively exposed.

Subsequently, as shown in FIG. 18F, the green pattern is developed.

Next, as shown in FIG. 18G, a red photosensitive resist 435 is applied.

As shown in FIG. 18H, a photomask 436 is formed over the red photosensitive resist 435, and the red photosensitive resist 435 is selectively exposed.

Subsequently, as shown in FIG. 18I, the red pattern is developed.

Next, as shown in FIG. 18J, a blue photosensitive resist 437 is applied.

As shown in FIG. 18K, a photomask 438 is formed over the blue photosensitive resist 437, and the blue photosensitive resist 437 is selectively exposed.

Subsequently, as shown in FIG. 18L, the blue pattern is developed.

Through the above-described manufacturing process, the infrared filter FLT321-4 of the second light sensor unit 32 and the aperture BMSK311 of the first light sensor unit 31 are formed.

Figure 19:
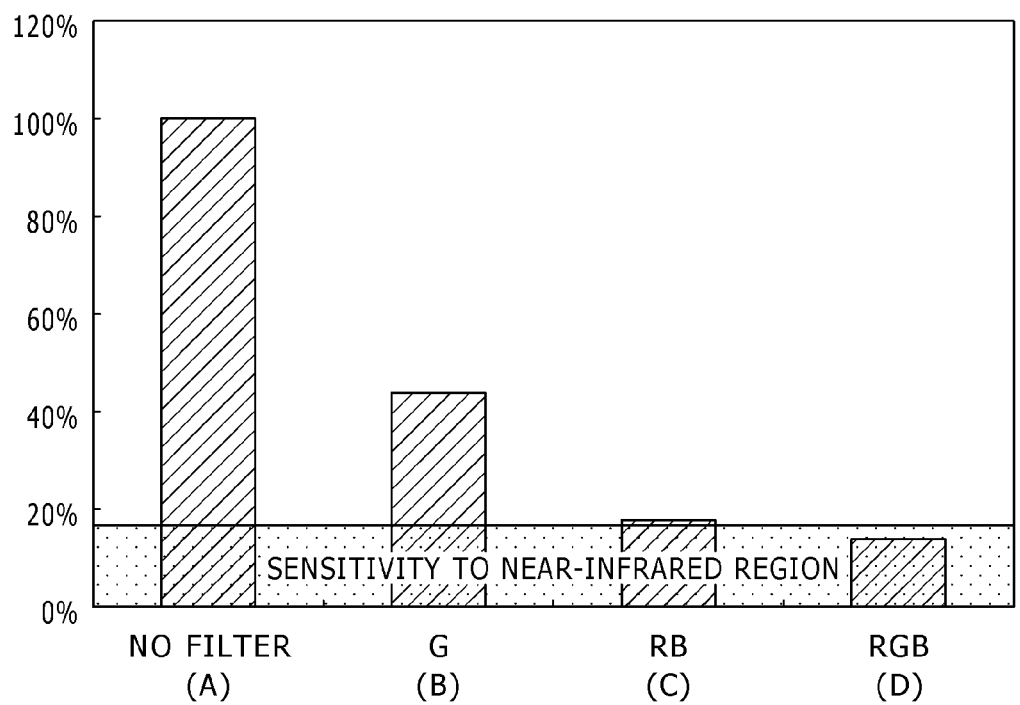
FIG. 19 is a diagram showing one example of the infrared sensitivity characteristic of the second light sensor unit having the infrared filter of the first to fourth configuration examples.

FIG. 19 is a diagram showing one example of the infrared sensitivity characteristic of the second light sensor unit having the infrared filter of the first to fourth configuration examples.

In FIG. 19, the infrared sensitivity characteristics in the following cases (A) to (D) are shown: (A) no infrared filter is formed; (B) merely one color filter of the green filter FLT-G is formed; (C) two color filters of the red filter FLT-R and the blue filter FLT-B are stacked; and (D) three color filters of the green filter FLT-G, the red filter FLT-R, and the blue filter FLT-B are stacked.

As is apparent from FIG. 19, the sensitivity to the near-infrared region is not favorable when no infrared filter is formed and when merely one color filter of the green filter FLT-G is formed.

In contrast, the sensitivity to the near-infrared region is favorable when two color filters of the red filter FLT-R and the blue filter FLT-B are stacked and when three color filters of the green filter FLT-G, the red filter FLT-R, and the blue filter FLT-B are stacked.

From this fact, it is apparent that two or more color filters of different colors should be stacked in order to achieve the infrared filter having favorable sensitivity to the near-infrared region.

Figure 20:
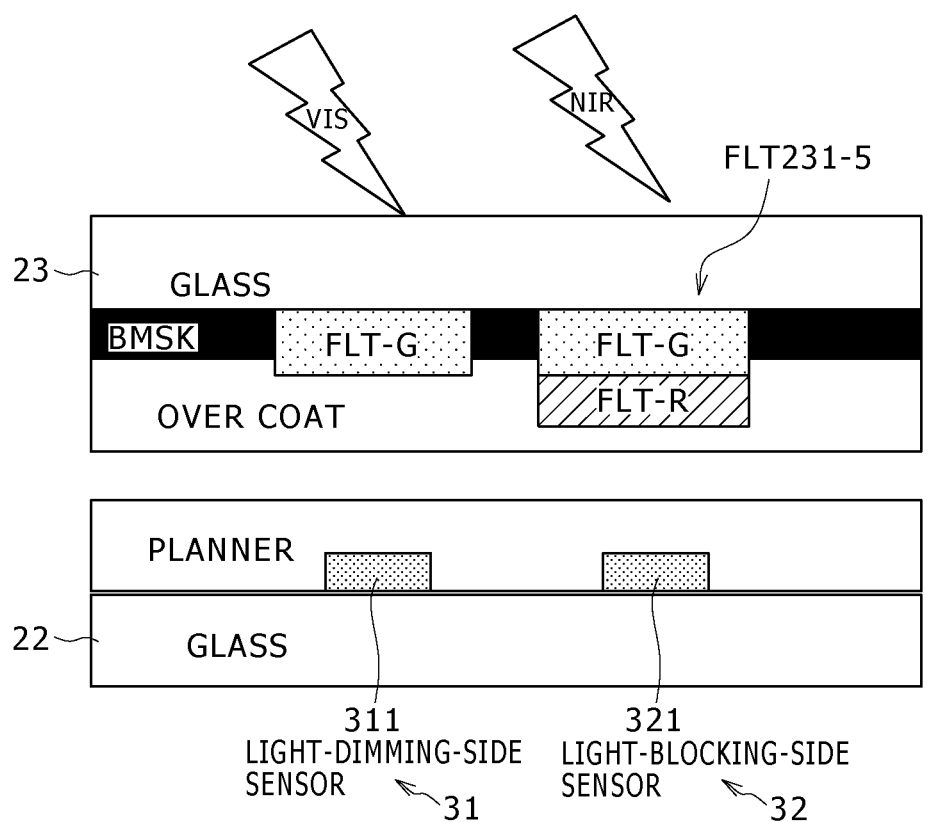
FIG. 20 is a diagram showing a first configuration example including the first light sensor unit and the second light sensor unit for which the infrared filter obtained by stacking the green color filter and the red color filter is formed.
Figure 21:
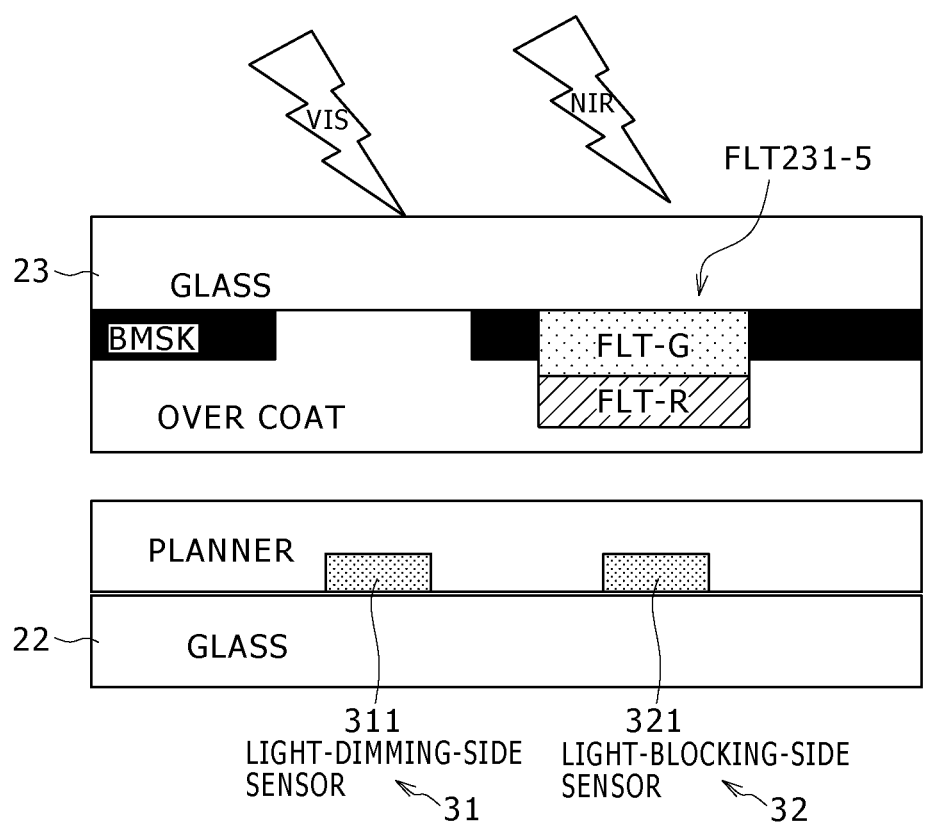
FIG. 21 is a diagram showing a second configuration example including the first light sensor unit and the second light sensor unit for which the infrared filter obtained by stacking the green color filter and the red color filter is formed.

In the above description, two color filters of the red filter FLT-R and the blue filter FLT-B are stacked as the infrared filter of a two-layer structure in the respective examples. Alternatively, as shown in FIGS. 20 and 21, an infrared filter FLT321-5 obtained by stacking two color filters of the green filter FLT-G and the red filter FLT-R can be employed.

The manufacturing process for this case is similar to that described above, and therefore the detailed description thereof is omitted.

Also in this case, the sensitivity to the near-infrared region is favorable.

In the light detector 3 having the above-described configuration, the light-dimming-side sensor (light-receiving element 311) of the first light sensor unit 31 and the light-blocking-side sensor (light-receiving element 321) of the second light sensor unit 32 are connected in series to each other close to (in proximity to) each other between the supply potential VDD and the reference potential VSS (e.g. ground potential GND).

In the light detector 3, ambient light incident on the effective display area unit 2 is received by the light-dimming-side sensor (light-receiving element 311) of the first light sensor unit 31 directly or via e.g. one green filter FLT-G. On the other hand, the light-blocking-side sensor (light-receiving element 321) of the second light sensor unit 32 receives light of the infrared region resulting from the passage through the infrared filter FLT321.

By using the comparator 34, the light detector 3 compares the reference voltage with a signal resulting from subtraction of the infrared component obtained as the current component detected by the light-blocking-side sensor (light-receiving element 321) of the second light sensor unit 32 from the current component detected by the light-dimming-side sensor (light-receiving element 311) of the first light sensor unit 31. The comparison result is obtained as an external-light intensity signal and is output as the detection signal S3 to the signal processing circuit 6.

The detection signal S3 by the light detector 3 results from the removal of the infrared-region component detected by the light-dimming-side sensor (light-receiving element 311).

The signal processing circuit 6 changes the surface luminance of the effective display area unit (screen display part) 2 based on the control signal CTL depending on the output level of the detection signal S3 of the light detector 3.

As described above, according to the first embodiment, the light detector 3 has the first light sensor unit 31 that includes the light-receiving element 311 and detects the intensity of ambient light to the display area, and the second light sensor unit 32 in which the infrared filter FLT321 is disposed on the optical path to the light-receiving element 321. Furthermore, the light detector 3 has a function to subtract the component that is detected by the second light sensor unit 32 and is equivalent to at least the infrared component from the output by the first light sensor unit 31. In addition, the infrared filter FLT321 is formed by stacking at least two kinds of color filters. Thus, the following advantages can be achieved.

Specifically, in the present embodiment, the near-infrared sensitivity as well as the individual difference in the sensor can be cancelled, and thus the ambient illuminance of the visible region can be accurately evaluated.

Furthermore, the infrared filter can be formed simultaneously with the existing color filters. Therefore, the manufacturing process is not affected and cost increase is not caused.

In addition, a photolithography process is used to form the infrared filter, and thus the positional accuracy of the filter formation is high. Therefore, even when the sensor is disposed near the display area, interference between the display area and the sensor is absent, which imposes no limit to the disposing of the sensor.

Moreover, the influence of noise can be suppressed and the SN ratio of the light-reception system can be enhanced without requiring calibration operation at the time of power activation.

<Second Embodiment>

Figure 22:
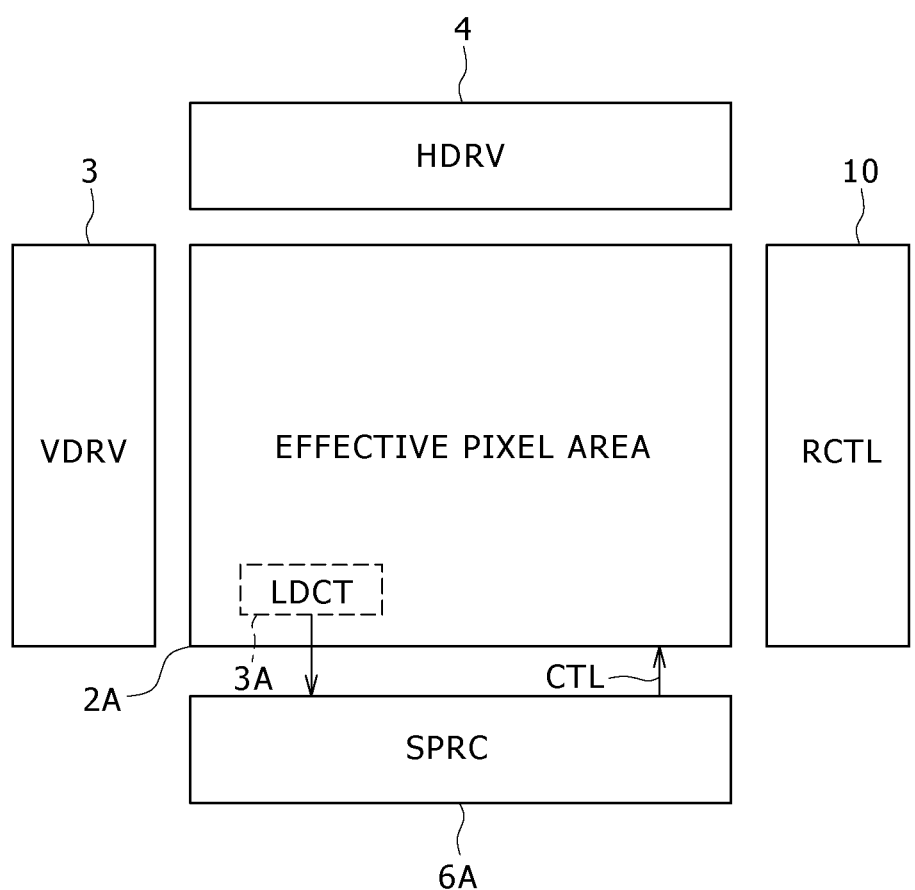
FIG. 22 is a block diagram showing a configuration example of a liquid crystal display device according to a second embodiment.

FIG. 22 is a block diagram showing a configuration example of a liquid crystal display device according to a second embodiment.

Figures 23A, 23B, 23C:
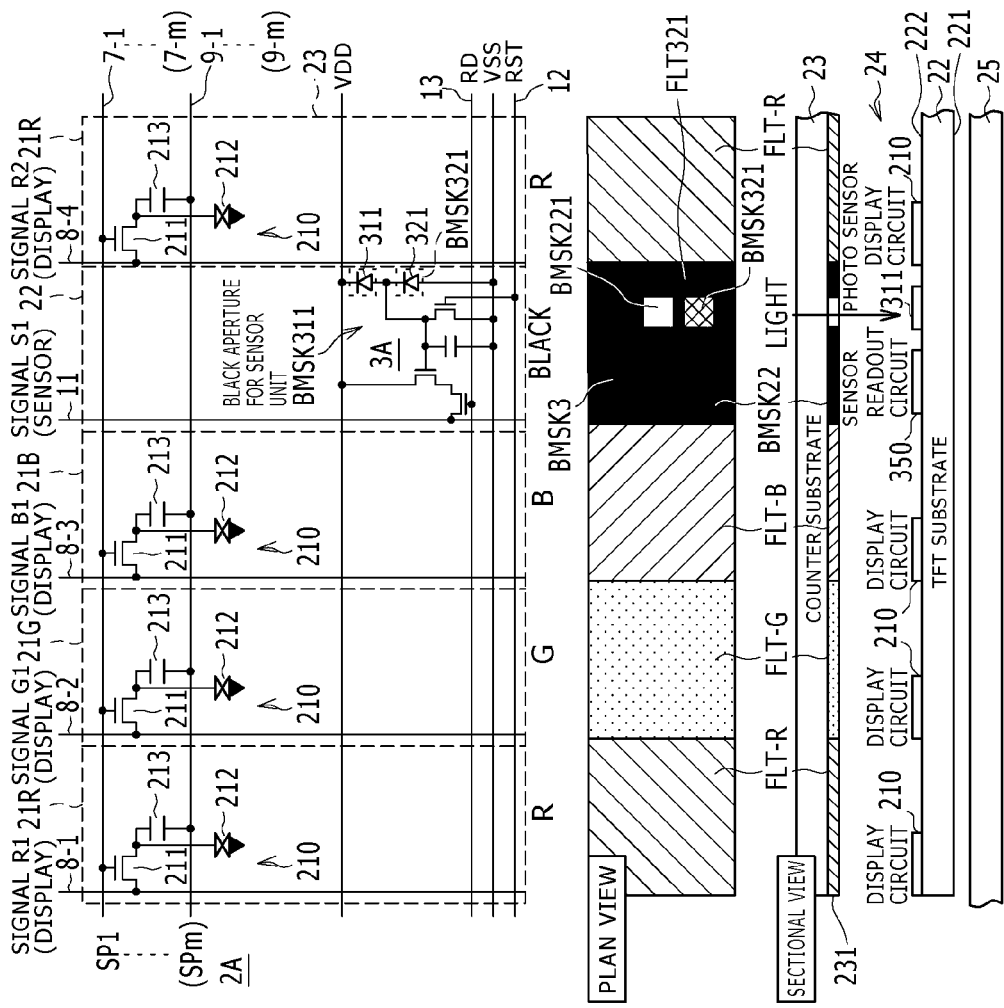
FIGS. 23A to 23C are diagrams showing a configuration example of an effective display area unit in the liquid crystal display device of FIG. 22.

FIGS. 23A to 23C are diagrams showing a configuration example of the effective display area unit in the liquid crystal display device of FIG. 22, FIG. 23A shows the matrix arrangement of cells, FIG. 23B is a plan view, and FIG. 23C is a sectional view.

A liquid crystal display device 1A of the second embodiment is different from the above-described liquid crystal display device 1 of the first embodiment. Specifically, in the second embodiment, a light detector 3A is formed integrally with an effective display area unit 2A in contrast to the first embodiment, in which the light detector 3 is formed outside the effective display area unit 2 (in the non-display area outside the effective area of the display area unit) adjacent to the effective display area unit 2.

As shown in FIG. 22, the liquid crystal display device 1A includes the effective display area unit (image display part) 2A as a display unit, the light detector 3A formed integrally with the effective display area unit 2, a vertical drive circuit (VDRV) 4, a horizontal drive circuit (HDRV) 5, a signal processing circuit (SPRC) 6A, and a light-reception control circuit (RCTL) 10.

The liquid crystal display device 1A of the second embodiment is configured to be capable of changing the surface luminance of the effective display area unit 2A (in fact, be capable of changing the light-emission intensity of a backlight 25) depending on the intensity (illuminance) of ambient light. That is, the liquid crystal display device 1A of the present embodiment has a light-dimming function.

In the effective display area unit 2A, plural display cells 21 each serving as a display pixel and each including a display circuit 210 are arranged in a matrix. The effective display area unit 2A serves as a display screen.

In a predetermined area of the effective display area unit 2A, the light detector 3A including a first light sensor unit 31 and a second light sensor unit 32 is disposed.

The basic configuration of the light detector 3A is similar to that of the light detector 3 in the first embodiment.

Specifically, the first light sensor unit 31 includes a light-receiving element (photo sensor, light-dimming-side sensor) 311, and detects the intensity of ambient light to the effective display area unit 2A.

The second light sensor unit 32 includes a light-receiving element 321. An infrared filter FLT321 is disposed on the optical path to this light-receiving element 321 so that dark current arising when light is blocked and leakage current due to sensitivity to the near-infrared region can be detected.

This infrared filter FLT321 is formed by stacking at least two kinds of color filters as described above. More specifically, the infrared filter FLT321 is formed by stacking at least two of color filters of red (R), green (G), and blue (B) as three primary colors, and has any of a multilayer structure composed of the red color filter and the blue color filter, a multilayer structure composed of the red color filter and the green color filter, and a multilayer structure composed of the red color filter, the green color filter, and the blue color filter.

The first light sensor unit 31 and the second light sensor unit 32 are disposed in an area over which a light-blocking object (e.g. a finger of a user) is not held, and in which ambient light can be received and the ambient light level can be detected.

For example, in a predetermined area of the effective display area unit 2A, a red display cell 21R, a green display cell 21G, and a blue display cell 21B corresponding to three primary colors are arranged in that order from the left side of FIG. 23, and the light detector 3A is disposed adjacent to the display cell 21B.

In addition, next to this light detector 3A, the red display cell 21R, the green display cell 21G, and the blue display cell 21B are arranged for example.

In the light detector 3A of FIG. 23, similarly to the first embodiment, the light-dimming-side sensor (light-receiving element 311) of the first light sensor unit 31 and the light-blocking-side sensor (light-receiving element 321) of the second light sensor unit 32 are connected in series to each other close to (in proximity to) each other between a supply potential VDD and a reference potential VSS (e.g. ground potential GND).

By using a comparator 34, the light detector 3A compares the reference voltage with a signal resulting from subtraction of the infrared component obtained as the current component detected by the light-blocking-side sensor (light-receiving element 321) of the second light sensor unit 32 from the current component detected by the light-dimming-side sensor (light-receiving element 311) of the first light sensor unit 31. As a result, the light detector 3A obtains an external-light intensity signal and outputs it as a detection signal S3A to the signal processing circuit 6A.

The detection signal S3A by the light detector 3A results from the removal of the infrared-region component detected by the light-dimming-side sensor (light-receiving element 311).

The signal processing circuit 6A controls the amount of the light supplied to the effective display area unit 2A depending on the detection signal S3A by the light detector 3A.

In the present embodiment, the signal processing circuit 6A changes the surface luminance of the effective display area unit (screen display part) 2A based on a control signal CTL depending on the output level of the detection signal S3A of the light detector 3A.

The effective display area unit 2A will be described in further detail below.

A black mask (light-blocking mask) BMSK3 having a light-blocking function is formed over the arrangement area of the light detector 3A.

In the black mask BMSK3 included in the first light sensor unit 31, an aperture BMSK311 for allowing light to be incident on the light-receiving element 311 is formed. In this aperture BMSK311, e.g. one kind of color filter such as a green color filter FLT-G is formed in some cases.

Similarly, in the black mask BMSK3 included in the second light sensor unit 32, an aperture BMSK321 for allowing light to be incident on the light-receiving element 321 is formed. In this aperture BMSK321, the infrared filter FLT321 formed of a multilayer structure of the color filters is formed.

The structure and so on of this infrared filter FLT321 are as described above.

In the effective display area unit 2A, as shown in FIG. 23C, a liquid crystal layer 24 is formed and enclosed between a TFT substrate (first transparent substrate) 22 composed of e.g. glass and a counter substrate (second transparent substrate) 23 similarly to the structure of FIG. 3C. The backlight 25 is disposed near a bottom surface 221 of the TFT substrate 22 for example.

On a substrate surface 222 of the TFT substrate 22, the display circuits 210 of the respective display cells 21, and a readout circuit 350 and the light-receiving element (photo sensor) 311 (321) of the light detector 3A are formed.

On the other hand, the filters FLT-R, FLT-G, and FLT-B, the black mask BMSK3, and the infrared filter FLT321 are formed on a substrate surface 231 of the counter substrate 23 as shown in FIG. 23C.

The display circuits 210 in the respective display cells 21 are similar to those in the first embodiment, and therefore the description thereof is omitted.

In the effective display area unit 2A, a light-reception signal line 11 is disposed corresponding to the light detector 3A.

The light-reception signal line 11 is connected to the signal processing circuit 6A, and transmits the detection signal S3A read out under control by the light-reception control circuit 10 to the signal processing circuit 6A.

For the light detector 3A, a first control line (reset signal line) 12 and a second control line (readout signal line) 13 are disposed along the pixel arrangement direction.

The driving of the first control line 12 and the second control line 13 is controlled by the light-reception control circuit 10.

Figure 24:
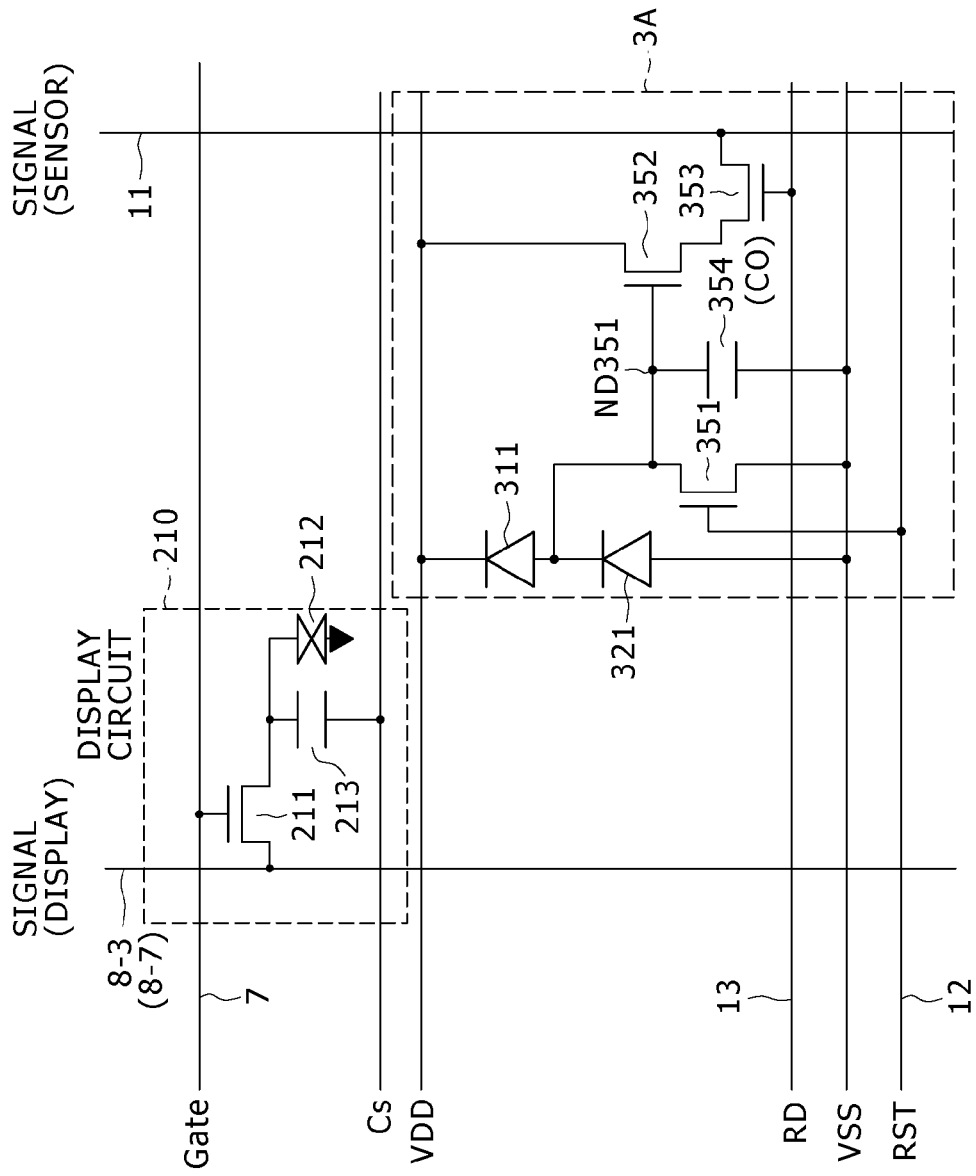
FIG. 24 is a circuit diagram showing a basic configuration example of a first light sensor unit (second light sensor unit) according to the second embodiment.

FIG. 24 is a circuit diagram showing a basic configuration example of the first light sensor unit (second light sensor unit) according to the present embodiment, and is an enlarged diagram of the circuit of FIG. 23A. In FIG. 24, the display circuit 210 in an adjacent display cell is also shown.

The light detector 3A of the second embodiment has, in addition to the light-receiving element 311 of the first light sensor unit 31 and the light-receiving element 321 of the second light sensor unit 32, a reset TFT 351, an amplifying TFT 352, a selection (readout) TFT 353, a capacitor 354 for accumulating a light-reception signal, and a node ND351 that are included in the readout circuit 350.

The light-receiving elements 311 and 321 are formed of a TFT, a diode, or the like.

The light-receiving element 311 and the light-receiving element 321 are connected in series to each other between the supply potential VDD and the reference potential VSS. Specifically, the cathode of the light-receiving element 311 is coupled to the supply potential VDD, and the anode thereof is connected to the cathode of the light-receiving element 321. The anode of the light-receiving element 321 is coupled to the reference potential VSS. The connecting node between the anode of the light-receiving element 311 and the cathode of the light-receiving element 321 is connected to the drain of the reset TFT 351.

The reset TFT 351 is formed of e.g. an n-channel transistor. The source thereof is coupled to the reference potential VSS (e.g. ground potential GND), and the drain thereof is connected to the node ND351. The gate electrode of the reset TFT 351 is connected to the first control line 12 disposed on the corresponding row.

The gate of the amplifying TFT 352 is connected to the node ND351. The drain thereof is coupled to the supply potential VDD, and the source thereof is connected to the drain of the selection TFT 353. The gate of the selection TFT 353 is connected to the second control line 13, and the source thereof is connected to the light-reception signal line 11 disposed on the corresponding column.

A so-called source follower is formed by the amplifying TFT 352 and the selection TFT 353. Therefore, a current source is connected to the light-reception signal line 11. This current source is formed in e.g. the signal processing circuit 6A in the present embodiment.

Furthermore, the capacitor 354 for accumulating a light-reception signal is connected between the node ND351 and the reference potential VSS.

Figure 25:
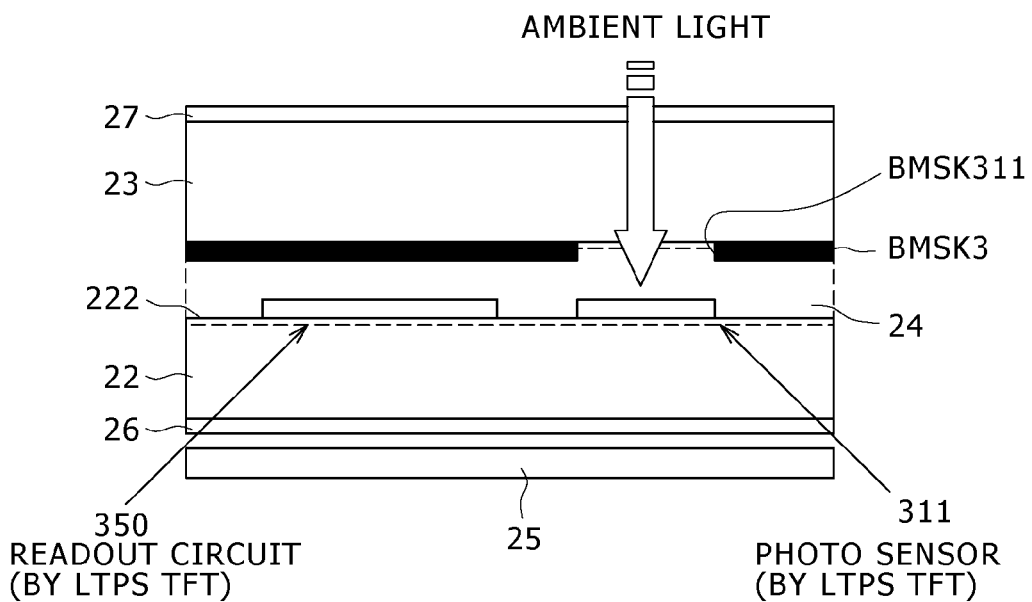
FIG. 25 is a schematic sectional view of the first light sensor unit according to the second embodiment.

FIG. 25 is a schematic sectional view of the first light sensor unit 31 according to the second embodiment, and is an enlarged diagram of the first light sensor unit 31 of FIG. 23C.

Figure 26:
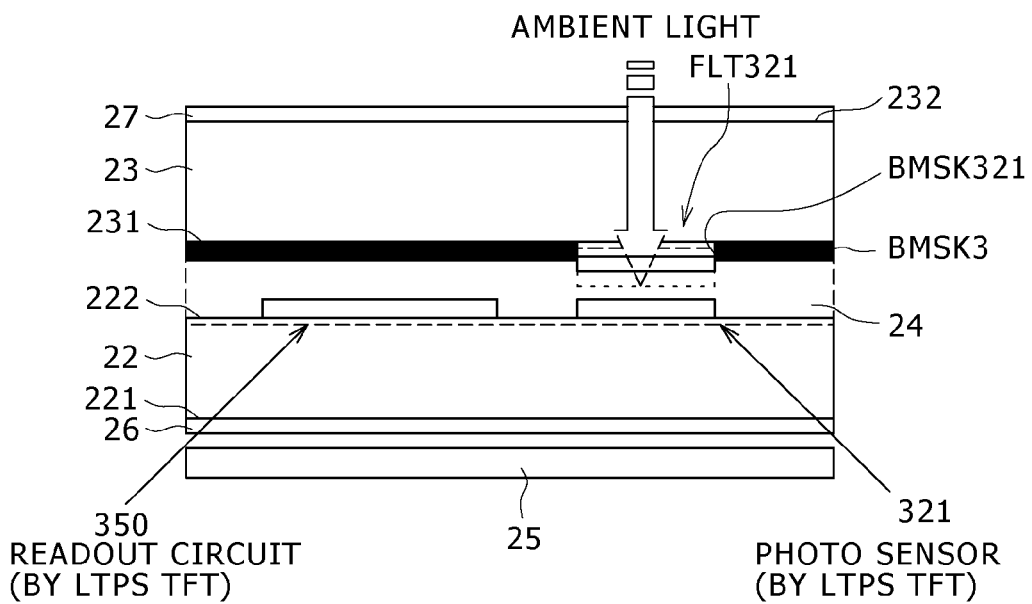
FIG. 26 is a schematic sectional view of the second light sensor unit according to the second embodiment.

FIG. 26 is a schematic sectional view of the second light sensor unit 32 according to the second embodiment, and is an enlarged diagram of the second light sensor unit 32 of FIG. 23C.

The first light sensor unit 31 and the second light sensor unit 32 of the light detector 3A are basically formed on the substrate surface 222 of the TFT substrate 22 formed of a transparent insulating substrate (e.g. glass substrate) as shown in FIGS. 25 and 26. The light detector 3A is composed of the readout circuit 350 and the light-receiving elements (photo sensors) 311 and 321.

The black mask BMSK3 is formed on the substrate surface 231 of the counter substrate 23 formed of a transparent insulating substrate (e.g. glass substrate). In the black mask BMSK3 opposed to the formation areas of the light-receiving elements (photo sensors) 311 and 321, the apertures BMSK311 and BMSK321 for guiding ambient light to the light-receiving elements (photo sensors) 311 and 321 are formed.

The liquid crystal layer 24 is enclosed between the TFT substrate 22 and the counter substrate 23. The backlight 25 is disposed near the bottom surface 221 of the TFT substrate 22 for example.

A polarizing filter 26 is formed on the bottom surface 221 of the TFT substrate 22, and a polarizing filter 27 is formed on the front surface (light-incident surface) 232 of the counter substrate 23.

The light-receiving elements (photo sensors) 311 and 321 and the readout circuit 350 are formed of low-temperature poly-silicon (LTPS) TFTs.

Furthermore, as described above in association with FIG. 5, the photo sensors (light-receiving elements) of the first light sensor unit and the second light sensor unit can be formed by a TFT.

In the present embodiment, the infrared filter FLT321 formed of a multilayer structure of the color filters is formed in the aperture BMSK321 of the second light sensor unit 32.

A configuration example and a fabrication method of the infrared filter FLT321 according to the present embodiment are the same as those in the first embodiment, and therefore the description thereof is omitted.

The configuration and the function of the display device will be described in further detail below.

The first control line 12 and the second control line 13 are connected to the light-reception control circuit 10.

The light-reception control circuit 10 applies a reset pulse RST to the first control line 12 at a predetermined timing.

Due to this application, the reset TFT 351 in the light detector 3A is in the on-state during a predetermined period, so that the node ND351 is reset.

In other words, in the light detector 3A, e.g. charges in the capacitor 354 connected to the node ND351 are discharged and the potential of the node ND351 is set to the reference potential, so that the light detector 3A becomes the initial state.

If the light-receiving elements 311 and 321 receive a predetermined amount of light in this state, the light-receiving elements 311 and 321 are turned on. Thus, the potential of the node ND351 increases due to a signal resulting from subtraction of the infrared component obtained as the current component detected by the light-blocking-side sensor (light-receiving element 321) of the second light sensor unit 32 from the current component detected by the light-dimming-side sensor (light-receiving element 311) of the first light sensor unit 31. Consequently, charges are accumulated in the capacitor 354.

At this time, a readout signal RD at the high level is applied to the second control line 13 by the light-reception control circuit 10, so that the selection TFT 353 is kept at the on-state. Due to this operation, the charges accumulated in the capacitor 354 are amplified as an electric signal by the amplifying TFT 352, followed by being output as a light-reception signal to the light-reception signal line 11 via the selection TFT 353.

The detection signal S3A transmitted through the light-reception signal line 11 is input to the signal processing circuit 6A, and the signal processing circuit 6A changes the surface luminance of the effective display area unit (screen display part) 2A based on e.g. the control signal CTL depending on the level of the detection signal S3A.

The second embodiment can achieve the same advantages as those by the above-described first embodiment.

In the first and second embodiments, the light-dimming-side sensor (light-receiving element 311) of the first light sensor unit 31 and the light-blocking-side sensor (light-receiving element 321) of the second light sensor unit 32 are disposed in proximity to each other, and difference processing for removing the infrared component is carried out in the light detector.

However, the embodiments are not limited thereto. For example, as shown in FIG. 27, it is also possible to employ a configuration in which a detection signal of the light-dimming-side sensor (light-receiving element 311) and a detection signal of the light-blocking-side sensor (light-receiving element 321) are read out separately from each other and the infrared component is removed by the signal processing circuit 6 disposed outside an effective display area unit 2B.

Figure 27:
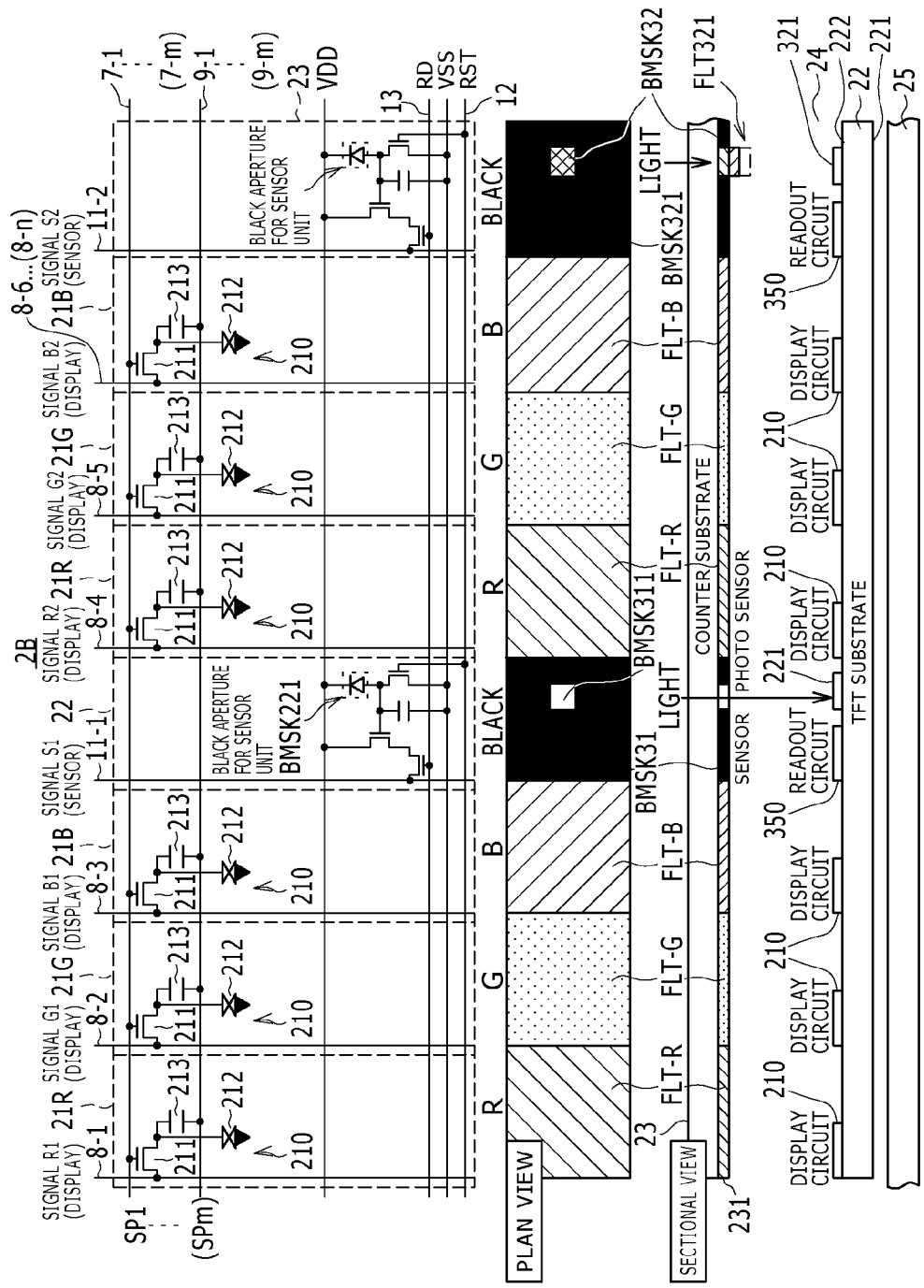
FIGS. 27A to 27C are diagrams showing another example of the arrangement of the first light sensor unit and the second light sensor unit according to the second embodiment.

In this case, as shown in FIG. 27, in the first light sensor unit 31, the cathode of the light-dimming-side sensor (light-receiving element 311) is coupled to the supply potential VDD and the anode thereof is connected to the node ND351.

Similarly, in the second light sensor unit 32, the cathode of the light-blocking-side sensor (light-receiving element 321) is coupled to the supply potential VDD and the anode thereof is connected to the node ND351.

Other configurations and the function are basically similar to those of the second embodiment, and therefore the detailed description thereof is omitted.

The above description has dealt with liquid crystal display devices that have a light-dimming function, specifically, are capable of changing the surface luminance of the effective display area units 2, 2A, and 2B (in fact, are capable of changing the light-emission intensity of the backlight 25) depending on the intensity (illuminance) of ambient light.

Figure 28:
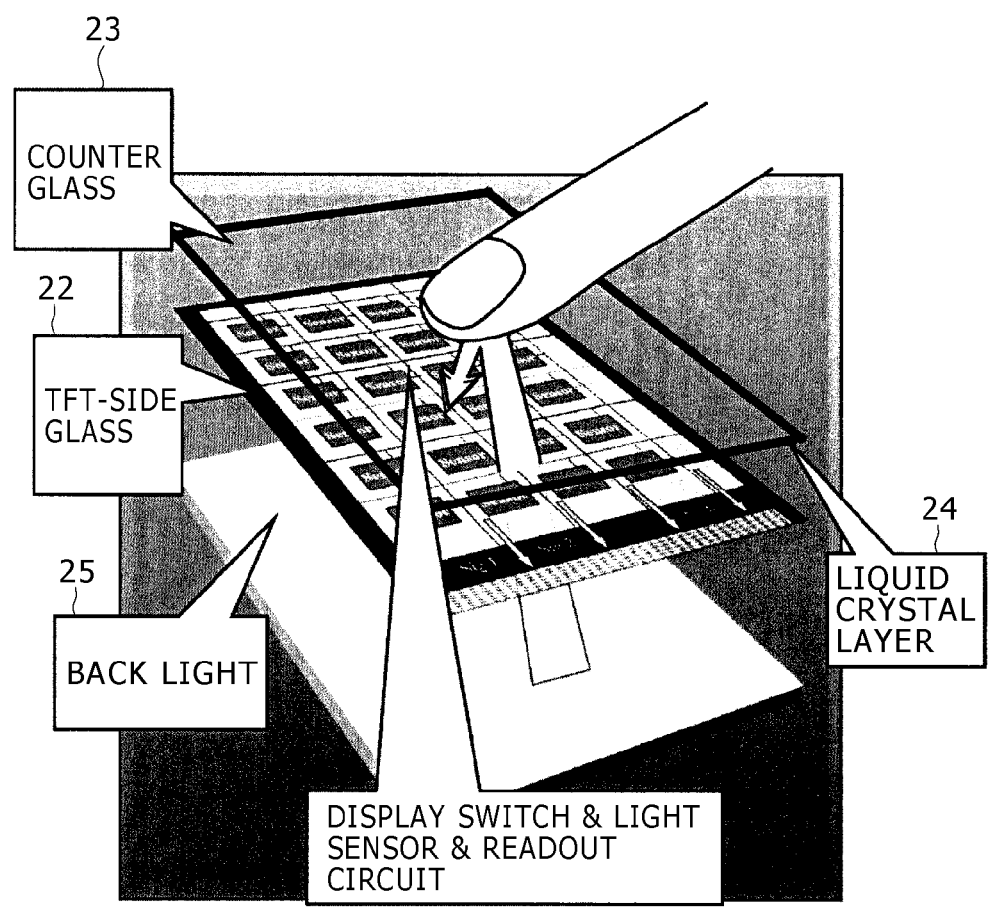
FIG. 28 is a diagram schematically showing a detection system for reflected light originating from a backlight.

However, the embodiment is not limited to the light-dimming function but can be applied also to, for example, a detection system for reflected light originating from a backlight, like that shown in FIG. 28.

In this case, the first light sensor unit 31 is used as a detection cell, and the second light sensor unit 32 is used as a reference cell.

In the following, a feature will also be described that a signal resulting from extreme suppression of the influence of reflection noise, dark current arising when light is blocked, leakage current due to sensitivity to the near-infrared region, and offset noise in the first light sensor unit 31 is obtained through difference signal processing for a detection signal of the first light sensor unit 31 and a detection signal of the second light sensor unit 32.

The following description will deal with an example formed as a detection system for reflected light originating from a backlight as shown in FIG. 28.

FIGS. 29A and 29B are diagrams for explaining the reason why noise can be removed through the difference signal processing for output signals of the first light sensor unit 31 and the second light sensor unit 32 according to the present embodiment. FIG. 29A is a diagram showing the state of the first light sensor unit, and FIG. 29B is a diagram showing the state of the second light sensor unit.

In FIGS. 29A and 29B, Arrowhead A indicates detection-subject light, and Arrowhead B indicates noise light.

In the first light sensor unit 31 in the detection system for reflected light originating from a backlight, as shown in FIGS. 28 and 29A, the detection-subject light A from the backlight 25 passes through the polarizing filter 26, the TFT substrate 22, the liquid crystal layer 24, the aperture BMSK311 of the black mask BMSK3 of the first light sensor unit 31 disposed at a predetermined position (coordinate position), the counter substrate 23, and the polarizing filter 27 in the effective display area unit 2A, so as to be reflected by a detection subject of a user (e.g. a finger) disposed on the front surface side 232 of the counter substrate 23.

The reflected light A passes through the polarizing filter 27, the counter substrate 23, and the liquid crystal layer 24 and is received, via the aperture BMSK311 of the black mask BMSK3 of the first light sensor unit 31, by the active region (channel region) of the light-receiving element (photo sensor) 311 formed of e.g. a TFT so as to be extracted as a photo current.

In the first light sensor unit 31, as the light originating from the backlight 25, e.g. the following kinds of light exist besides the detection-subject light A: noise light B1 that enters the light-receiving element 311 after being reflected by the interface between the planarization film 343 and the liquid crystal layer 24; and noise light B2 that enters the light-receiving element 311 directly. In addition, leakage current arises due to sensitivity to the near-infrared region.

That is, the output signal of the first light sensor unit 31 includes the components due to the detection-subject light A, the noise light B1 and B2, and so on.

In the second light sensor unit 32, the infrared filter FLT321 is formed in the aperture BMSK321 of the black mask BMSK3. Therefore, as the light originating from the backlight 25, the detection-subject light A does not exist but the following kinds of light exist: the noise light B1 that enters the light-receiving element 321 after being reflected by the interface between the planarization film 343 and the liquid crystal layer 24; and the noise light B2 that enters the light-receiving element 321 directly. In addition, near-infrared light that has passed through the infrared filter FLT321 enters the light-receiving element 321.

Specifically, the detection signal (output signal) of the second light sensor unit 32 includes the components due to the noise light B1 and B2, and the leakage current component due to sensitivity to the near-infrared region, which is included also in the detection signal (output signal) of the first light sensor unit 31.

In the illustration of FIG. 29, the noise light B2 directly enters the channel region after directly passing through the gate electrode of the TFT. However, in fact, the gate electrode of the bottom-gate TFT is formed on the optical path of the light from the backlight to the channel region of the TFT. Thus, this illustration means that light is reflected by the gate electrode and runs around the gate electrode so as to become the noise light B2 in some cases.

Therefore, the noise component can be substantially removed by executing difference processing for a detection signal of the first light sensor unit 31 and a detection signal of the second light sensor unit 32 in the light detector 3, 3A, and the signal processing circuit 6.

As a result, the detection signal obtained through the difference processing is equivalent to a signal resulting from extreme suppression of the influence of reflection noise, dark current arising when light is blocked, leakage current due to sensitivity to the near-infrared region, and offset noise in the first light sensor unit 31.

As described above, the detection system according to the present embodiment has the plural display cells 21 each having the display circuit 210, the first light sensor unit 31 that includes the light-receiving element 311 and detects the intensity of ambient light to the display area, and the second light sensor unit 32 in which the infrared filter FLT321 is disposed on the optical path to the light-receiving element 321. Furthermore, the detection system has a function to subtract the component that is detected by the second light sensor unit 32 and is equivalent to at least the infrared component from the detection signal of the first light sensor unit 31. In addition, the infrared filter FLT321 is formed by stacking at least two kinds of color filters. Thus, the following advantages can be achieved.

Specifically, in the present embodiment, the near-infrared sensitivity as well as the individual difference in the sensor can be cancelled, and thus the ambient illuminance of the visible region can be accurately evaluated.

Furthermore, the infrared filter can be formed simultaneously with the existing color filters. Therefore, the manufacturing process is not affected and cost increase is not caused.

In addition, a photolithography process is used to form the infrared filter, and thus the positional accuracy of the filter formation is high. Therefore, even when the sensor is disposed near the display area, interference between the display area and the sensor is absent, which imposes no limit to the disposing of the sensor.

Moreover, the influence of noise can be suppressed and the SN ratio of the light-reception system can be enhanced without requiring calibration operation at the time of power activation.

Furthermore, in a system for realizing a touch panel, an image sensor, and so on by utilizing light that originates from a backlight and is reflected by a detection subject, the influence of noise due to light internally reflected by a layer under the black mask and leakage current due to sensitivity to the near-infrared region can be removed, which can enhance the SN ratio.

In the above-described system employing a backlight and an ambient-light imaging system, offset noise of the light-receiving element (photo sensor) and the pixel circuit can be removed, and thus the SN ratio can be enhanced.

In the above-described system employing a backlight and an ambient-light imaging system, interference noise from the display can be removed, and thus the SN ratio can be enhanced.

Because the above-described noise can be cancelled in real time, a highly-reliable system that has a favorable temperature characteristic and is robust to temporal variation can be achieved.

For the same reason as the above-described reason, calibration operation at the time of power activation is unnecessary.

One light-receiving element may be disposed per plural pixels, or one light-receiving element may be disposed for each of R, G, and B. Alternatively, one light-receiving element may be disposed per one pixel.

In the present specification, no particular reference is made to the way of the arrangement of the light-receiving element in the display device when the embodiment is applied. Applying the embodiment to a display device in which a light-receiving element is incorporated as above makes it possible to use a light-reception signal involving little influence of noise in post-processing, and makes it possible to carry out light reception (imaging) while preventing mixture of a displaying-side signal into an imaging-side signal.

Figure 30:
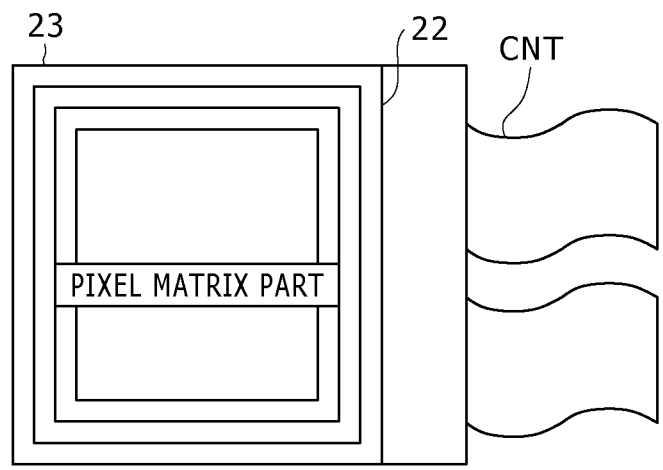
FIG. 30 is a schematic diagram showing an example of a flat module shape.

The display device according to the embodiment encompasses a display module having a flat module shape like that shown in FIG. 30.

For example, this display module is obtained as follows. A pixel array part in which pixels each including a liquid crystal element, a thin film transistor, a thin film capacitor, a light-receiving element and so on are integrally formed into a matrix is provided on an insulating substrate 22. Furthermore, an adhesive is disposed to surround this pixel array part (pixel matrix part), and a counter substrate 23 composed of glass or the like is bonded to the substrate.

This transparent counter substrate 23 may be provided with e.g. a color filter, protective film, and light-blocking film according to need. The display module may be provided with e.g. a flexible printed circuit (FPC) as a connector CNT for inputting/outputting of signals and so forth to/from the pixel array part from/to the external.

The display device according to the above-described embodiment can be applied to various kinds of electronic apparatus shown in FIGS. 31 to 35. Specifically, the display device can be used as a display device in electronic apparatus in any field that displays an image and video based on a video signal input to the electronic apparatus or produced in the electronic apparatus, such as a digital camera, notebook personal computer, portable terminal apparatus typified by a cellular phone, and video camera.

Examples of electronic apparatus to which the embodiment is applied will be described below.

Figure 31:
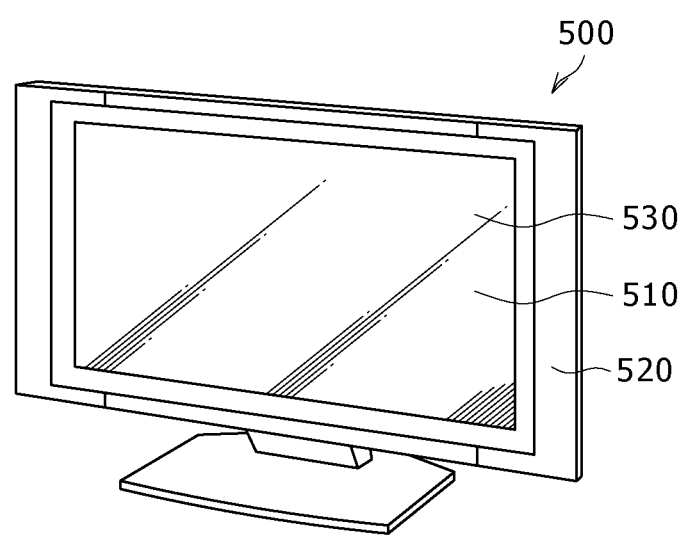
FIG. 31 is a perspective view showing a television according to an embodiment.

FIG. 31 is a perspective view showing a television embodiment.

A television 500 according to the present application example includes a video display screen 510 composed of a front panel 520, a filter glass 530, and so on, and is fabricated by using the display device according to embodiment as the video display screen 510.

Figure 32A:
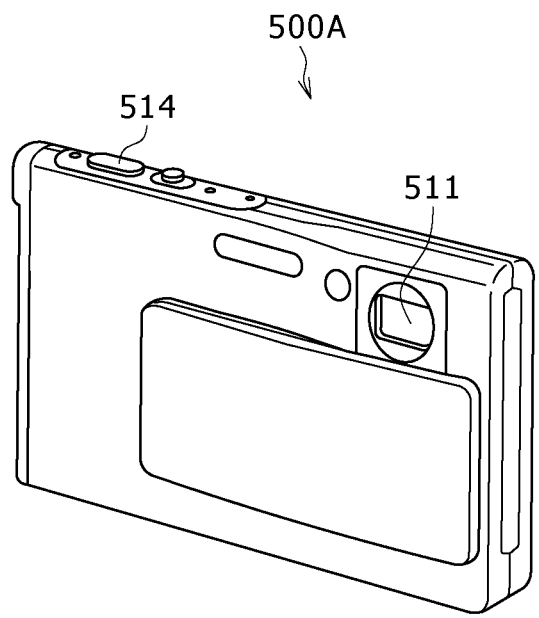
FIGS. 32A and 32B are perspective views showing a digital camera according to an embodiment.
Figure 32B:
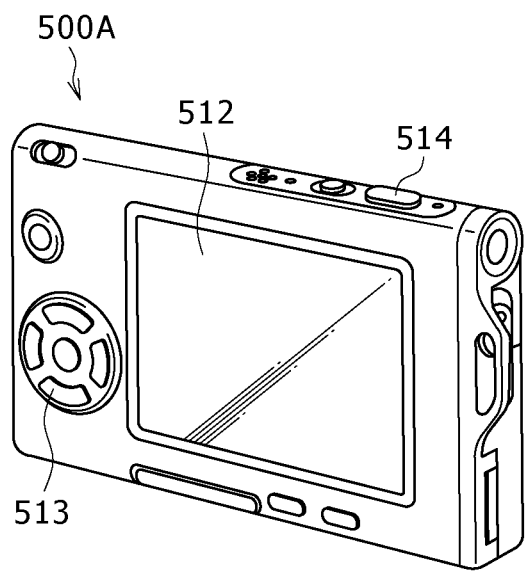

FIG. 32 is a perspective view showing a digital camera according to an embodiment is applied: FIG. 32A is a front-side view and FIG. 32B is a rear-side view.

A digital camera 500A according to the present application example includes a light emitter 511 for flash, a display part 512, a menu switch 513, a shutter button 514, and so on, and is fabricated by using the display device according to an embodiment as the display part 512.

Figure 33:
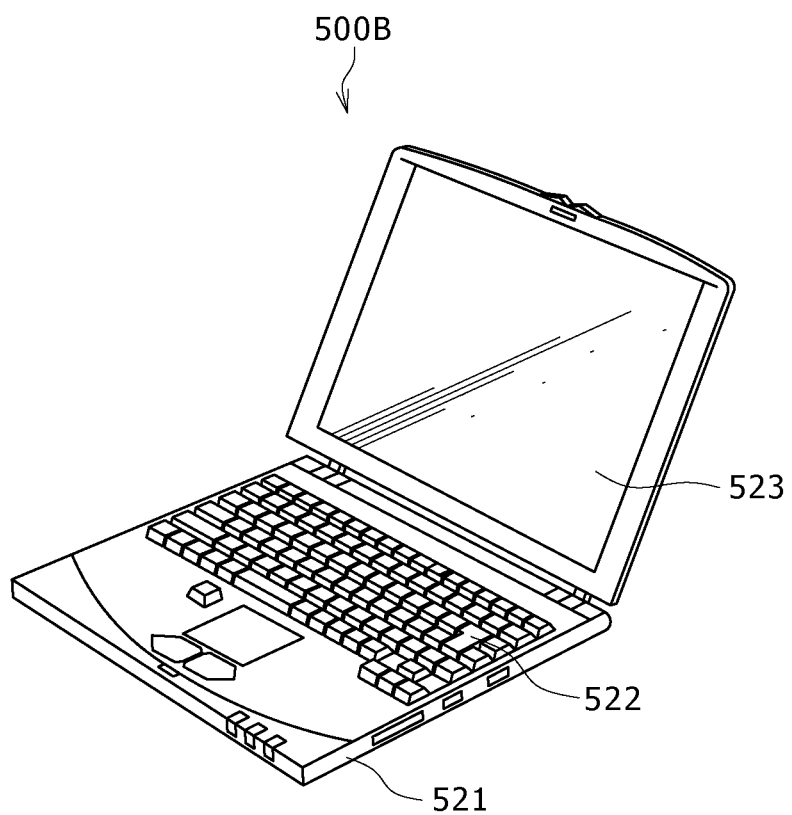
FIG. 33 is a perspective view showing a notebook personal computer according to an embodiment.

FIG. 33 is a perspective view showing a notebook personal computer according to an embodiment.

A notebook personal computer 500B according to the present application example includes, in a main body 521 thereof, a keyboard 522 operated in inputting of characters and so forth, a display part 523 for image displaying, and so on. The notebook personal computer 500B is fabricated by using the display device according to the embodiment as the display part 523.

Figure 34:
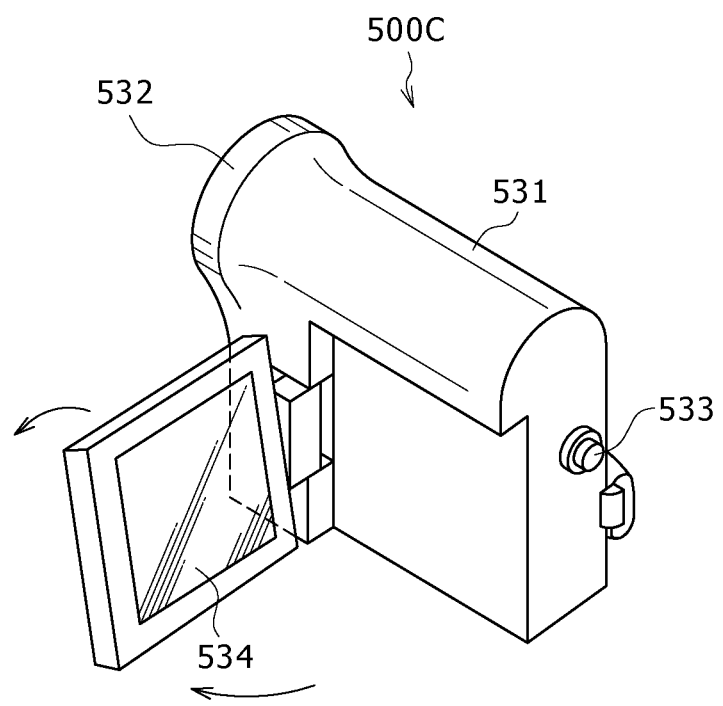
FIG. 34 is a perspective view showing a video camera according to an embodiment.

FIG. 34 is a perspective view showing a video camera according to an embodiment.

A video camera 500C according to an embodiment example includes a main body 531, a lens 532 that is disposed on the front side of the camera and used to capture a subject image, a start/stop switch 533 for imaging operation, a display part 534, and so on. The video camera 500C is fabricated by using the display device according to the embodiment as the display part 534.

Figure 35:
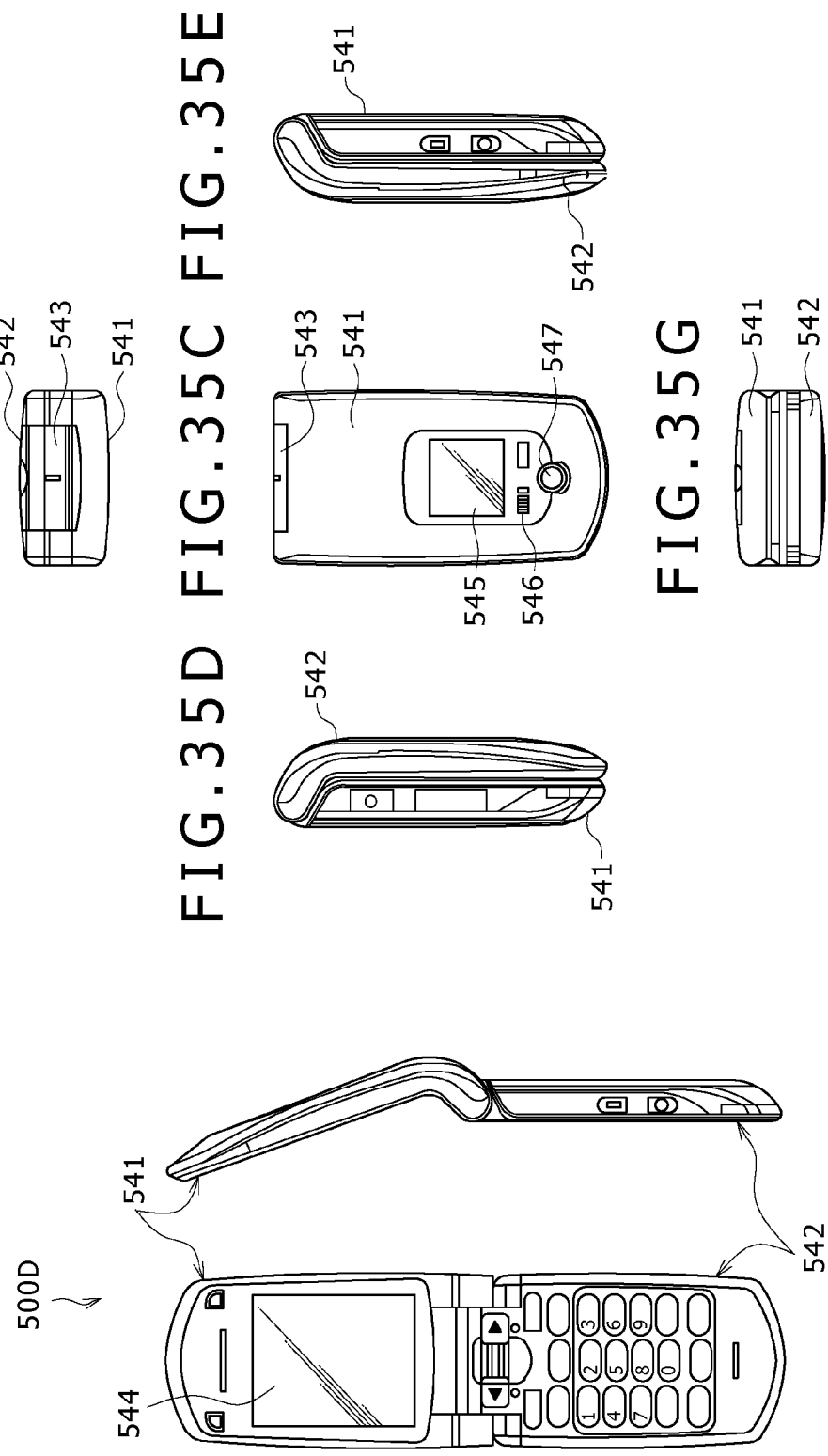
FIGS. 35A to 35G are diagrams showing a cellular phone as portable terminal apparatus according to an embodiment.

FIG. 35 is a diagram showing a cellular phone as portable terminal apparatus to which the embodiment is applied: FIGS. 35A and 35B are a front view and side view, respectively, of the opened state, and FIGS. 35C, 35D, 35E, 35F, and 35G are a front view, left-side view, right-side view, top view, and bottom view, respectively, of the closed state.

A cellular phone 500D according to the present application example includes an upper casing 541, a lower casing 542, a connection (hinge) 543, a display 544, a sub-display 545, a picture light 546, a camera 547, and so on. The cellular phone 500D is fabricated by using the display device according to the embodiment as the display 544 and the sub-display 545.

Furthermore, the display device according to the embodiment can be applied to the following display-and-imaging device. This display-and-imaging device can be applied to the above-described various kinds of electronic apparatus.

Figure 36:
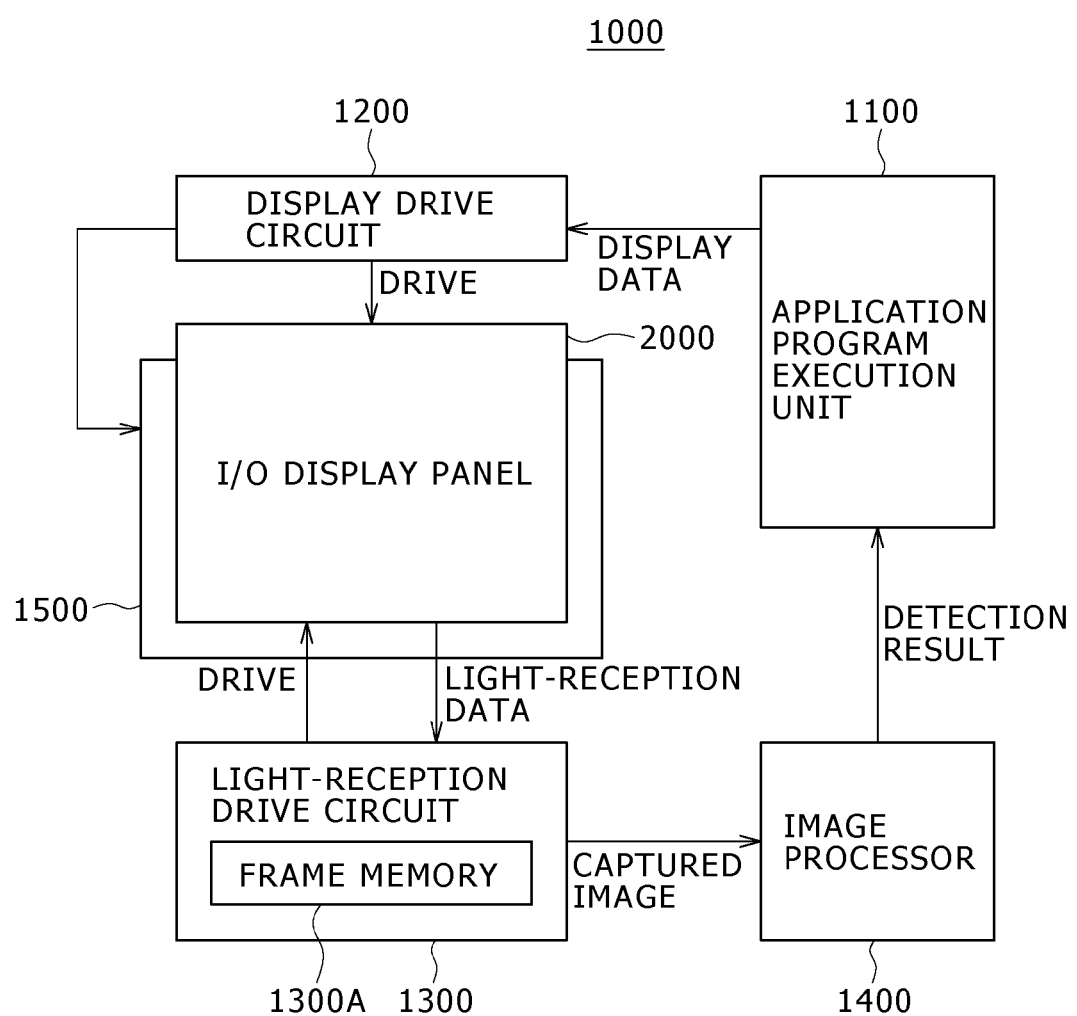
FIG. 36 is a block diagram showing the configuration of a display-and-imaging device according to an embodiment.

FIG. 36 is a diagram showing the entire configuration of the display-and-imaging device.

This display-and-imaging device 1000 includes an I/O display panel 2000, a backlight 1500, a display drive circuit 1200, a light-reception drive circuit 1300, an image processor 1400, and an application program execution unit 1100.

The I/O display panel 2000 is formed of a liquid crystal panel (liquid crystal display (LCD)) in which plural pixels are arranged in a matrix across the entire surface. The I/O display panel 2000 has a function (display function) to display a predetermined image such as graphics and characters based on display data through line-sequential operation, and has a function (imaging function) to capture the image of an object in contact with or in proximity to the I/O display panel 2000 as described later.

The backlight 1500 is a light source for the I/O display panel 2000 and includes e.g. plural light-emitting diodes. The backlight 1500 is turned on and off at high speed at predetermined timings in synchronization with the operation timings of the I/O display panel 2000 as described later.

The display drive circuit 1200 drives the I/O display panel 2000 (drives the line-sequential operation of the I/O display panel 2000) for displaying of an image based on display data on the I/O display panel 2000 (for the display operation of the I/O display panel 2000).

The light-reception drive circuit 1300 drives the I/O display panel 2000 (drives the line-sequential operation of the I/O display panel 2000) for acquisition of light-reception data by the I/O display panel 2000 (for imaging of an object by the I/O display panel 2000). The light-reception data by the respective pixels are accumulated in a frame memory 1300A e.g. on a frame-by-frame basis and are output as a captured image to the image processor 1400.

The image processor 1400 executes predetermined image processing (arithmetic processing) based on the captured image output from the light-reception drive circuit 1300, and detects and acquires information on an object in contact with or in proximity to the I/O display panel 2000 (position coordinate data, data relating to the shape and the size of the object, and so forth). Details of the processing of the detection will be described in detail later.

The application program execution unit 1100 executes processing corresponding to predetermined application software based on the detection result by the image processor 1400.

Examples of the processing include one for incorporating the position coordinates of the detected object into display data to thereby display the object on the I/O display panel 2000.

The display data produced by the application program execution unit 1100 is supplied to the display drive circuit 1200.

Figure 37:
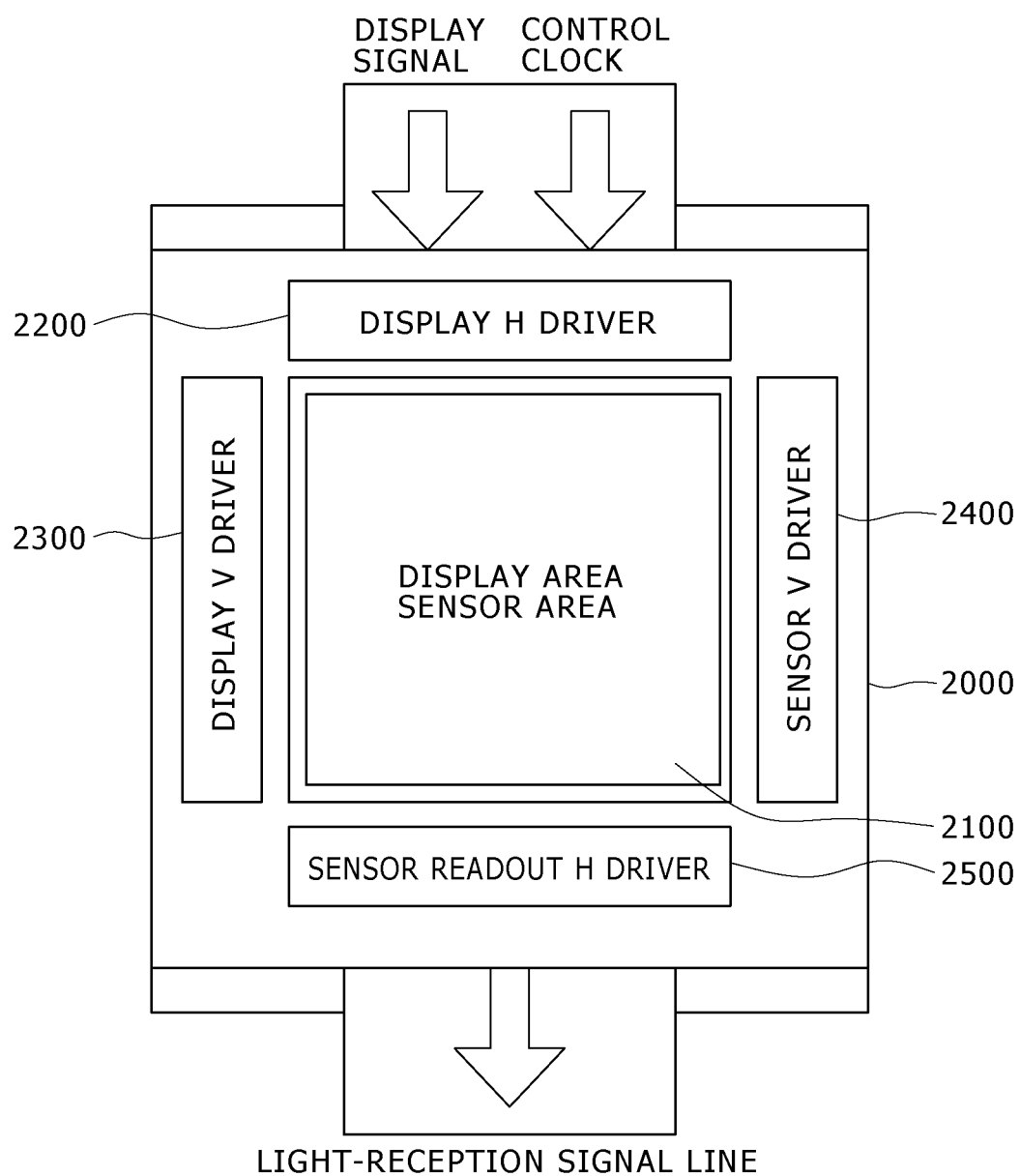
FIG. 37 is a block diagram showing a configuration example of an I/O display panel shown in FIG. 36.

A detailed configuration example of the I/O display panel 2000 will be described below with reference to FIG. 37. The I/O display panel 2000 includes a display area (sensor area) 2100, a display H driver 2200, a display V driver 2300, a sensor readout H driver 2500, and a sensor V driver 2400.

The display area (sensor area) 2100 is an area for emitting display light through modulation of light from the backlight 1500 and capturing the image of an object in contact with or in proximity to this area. In this area, liquid crystal elements as light-emitting elements (display elements) and light-receiving elements (imaging elements) to be described later are arranged in a matrix.

The display H driver 2200 line-sequentially drives the liquid crystal elements of the respective pixels in the display area 2100 together with the display V driver 2300, based on a display signal and a control clock for display driving, supplied from the display drive circuit 1200.

The sensor readout H driver 2500 line-sequentially drives the light-receiving elements of the respective pixels in the sensor area 2100 together with the sensor V driver 2400, to thereby acquire a light-reception signal.

Figure 38:
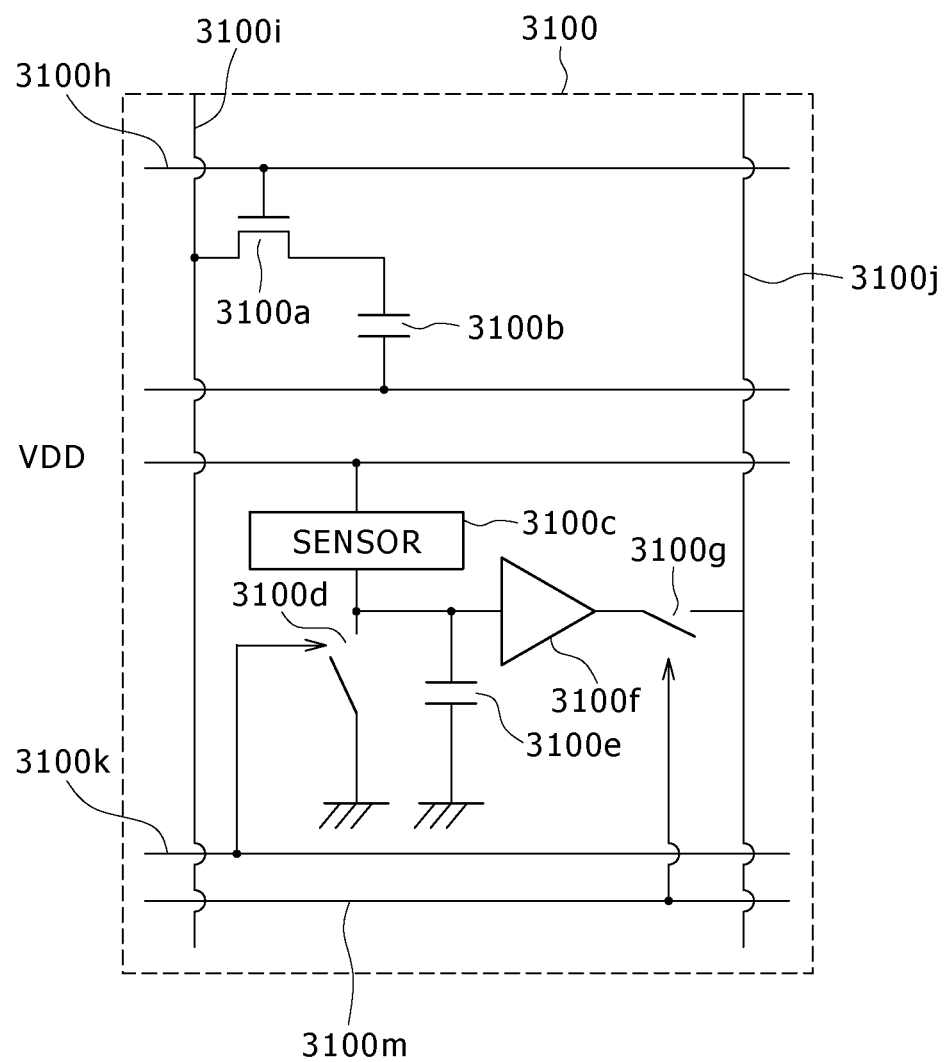
FIG. 38 is a circuit diagram showing a configuration example of each pixel.

A detailed configuration example of each pixel in the display area 2100 will be described below with reference to FIG. 38. A pixel 3100 shown in FIG. 38 includes a liquid crystal element as a display element and a light-receiving element.

Specifically, on the display element side, a switching element 3100a formed of e.g. a thin film transistor (TFT) is disposed at the intersection of a gate electrode 3100h extending along the horizontal direction and a drain electrode 3100i extending along the vertical direction. A pixel electrode 3100b including a liquid crystal is disposed between the switching element 3100a and a counter electrode.

The switching element 3100a is turned on and off based on a drive signal supplied via the gate electrode 3100h. When the switching element 3100a is in the on-state, a pixel voltage is applied to the pixel electrode 3100b based on a display signal supplied via the drain electrode 3100i, so that the display state is set.

On the other hand, on the light-receiving element side adjacent to the display element, a light-reception sensor 3100C formed of e.g. a photo diode is disposed and a supply voltage VDD is provided thereto.

A reset switch 3100d and a capacitor 3100e are connected to the light-reception sensor 3100C. Charges dependent upon the light-reception amount are accumulated in the capacitor 3100e, and charges are reset by the reset switch 3100d.

At the turn-on timing of a readout switch 3100g, the accumulated charges are supplied via a buffer amplifier 3100f to a signal output electrode 3100j so as to be output to the external. The turning-on and -off of the reset switch 3100d is controlled by a signal supplied from a reset electrode 3100k. The turning-on and -off of the readout switch 3100g is controlled by a signal supplied from a readout control electrode 3100m.

Figure 39:
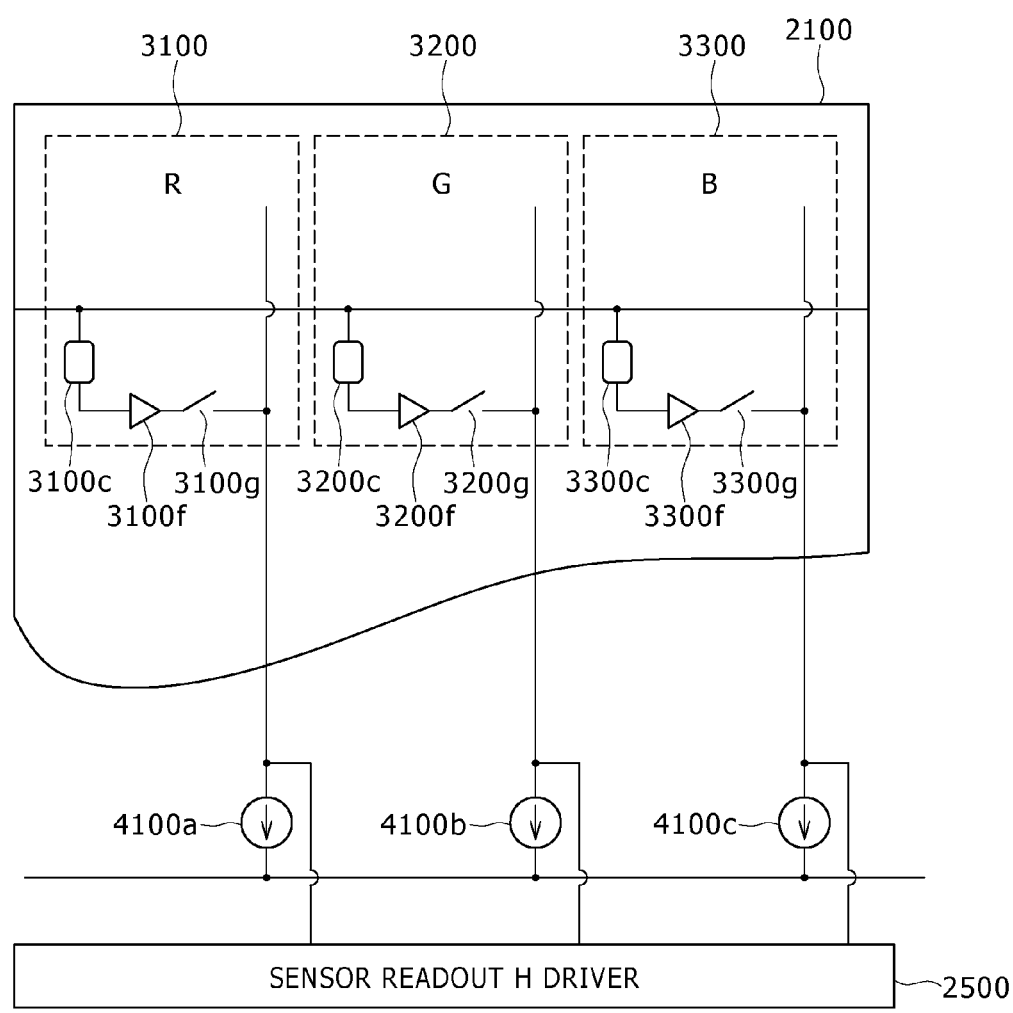
FIG. 39 is a circuit diagram for explaining the connection relationship between the respective pixels and a sensor read-out H driver.

With reference to FIG. 39, the connection relationship between the respective pixels in the display area 2100 and the sensor readout H driver 2500 will be described below. In this display area 2100, a pixel 3100 for red (R), a pixel 3200 for green (G), and a pixel 3300 for blue (B) are arranged.

Charges accumulated in capacitors connected to the light-reception sensors 3100c, 3200c, and 3300c in the respective pixels are amplified by buffer amplifiers 3100f, 3200f, and 3300*f* so as to be supplied via signal output electrodes to the sensor readout H driver 2500 at the turn-on timings of readout switches 3100g, 3200g, and 3300g, respectively.

Constant current sources 4100a, 4100b, and 4100c are connected to the respective signal output electrodes, and thus signals dependent upon the light-reception amounts are detected by the sensor readout H driver 2500 with favorable sensitivity.

The operation of the display-and-imaging device will be described in detail below.

Initially, the basic operation of this display-and-imaging device, i.e. display operation and object imaging operation in a pixel, will be described below.

In this display-and-imaging device, a drive signal for displaying is produced in the display drive circuit 1200 based on display data supplied from the application program execution unit 1100, and line-sequential display driving of the I/O display panel 2000 is carried out by this drive signal, so that an image is displayed.

At this time, the backlight 1500 is also driven by the display drive circuit 1200, so that light-on and light-off operation in synchronization with the I/O display panel 2000 is carried out.

Figure 40:
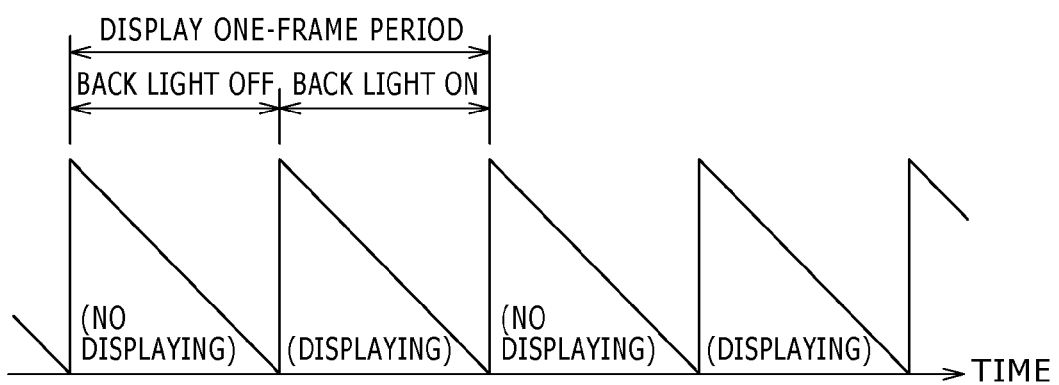
FIG. 40 is a timing diagram for explaining the relationship between the on-/off-state of a backlight and the display state.

In association with FIG. 40, the relationship between the on-/off-state of the backlight 1500 and the display state of the I/O display panel 2000 will be described below.

For example, in the case of image displaying with a frame cycle of 1/6 seconds, the backlight 1500 stops light emission (is in the off-state) and thus displaying is not carried out during the former period of each frame period (during 1/120 seconds). On the other hand, during the latter period of each frame period, the backlight 1500 emits light (is in the on-state) and display signals are supplied to the respective pixels, so that an image corresponding to this frame period is displayed.

As above, the former period of each frame period is a light-absent period during which display light is not emitted from the I/O display panel 2000. On the other hand, the latter period of each frame period is a light-present period during which display light is emitted from the I/O display panel 2000.

When there is an object (such as a fingertip) in contact with or in proximity to the I/O display panel 2000, the image of the object is captured by the light-receiving elements of the respective pixels in the I/O display panel 2000 based on line-sequential light-reception driving by the light-reception drive circuit 1300, and light-reception signals from the respective light-receiving elements are supplied to the light-reception drive circuit 1300. The light-reception signals of the pixels corresponding to one frame are accumulated in the light-reception drive circuit 1300 so as to be output as a captured image to the image processor 1400.

The image processor 1400 executes predetermined image processing (arithmetic processing) based on this captured image, so that information on the object in contact with or in proximity to the I/O display panel 2000 (position coordinate data, data relating to the shape and the size of the object, and so forth) is detected.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a plurality of display cells are arranged in an effective display area unit;
a first light sensor unit configured to include a light-receiving element and detect intensity of ambient light to a display area; and
a second light sensor unit configured to include a light-receiving element and be provided with an infrared filter disposed on an optical path to the light-receiving element,
wherein the first light sensor unit and the second light sensor unit with the infrared filter are formed in the effective display area unit,
wherein a signal processor configured to subtract a detection signal of the second light sensor unit from a detection signal of the first light sensor unit,
wherein the infrared filter is formed by stacking at least two kinds of color filters, and
wherein a first aperture for guiding light to the light-receiving element for the first light sensor unit is formed in a first light-blocking mask, a second aperture for guiding light to the light-receiving element for the second light sensor unit is formed in a second light-blocking mask, the infrared filter is formed in the aperture, and the first and second light-blocking masks are formed between adjacent display cells in the effective display area unit.

2. The display device according to claim 1, wherein the infrared filter is formed by stacking at least two of color filters of red R, green G, and blue B as three primary colors, and has any of a multilayer structure composed of the red color filter and the blue color filter, a multilayer structure composed of the red color filter and the green color filter, and a multilayer structure composed of the red color filter, the green color filter, and the blue color filter.

3. The display device according to claim 1, wherein surface luminance of the display area is changeable, and the signal processor changes the surface luminance of the display area depending on a result of the difference processing.

4. The display device according to claim 1, wherein the first light sensor unit is capable of detecting reflected light from an object, and the signal processor outputs a signal indicating whether or not an object exists near the first light sensor unit based on a result of difference processing for a detection signal of the first light sensor unit and a detection signal of the second light sensor unit.

5. The display device according to claim 4, further comprising
a backlight configured to emit display light to the display area, wherein
the signal processor controls a level of display light emitted by the backlight.

6. The display device according to claim 1, wherein a plurality of display cells are arranged in a matrix in an effective display area unit, and at least the first light sensor unit of the first light sensor unit and the second light sensor unit is so arranged as to be mixed in the matrix arrangement of the display cells.

7. The display device according to claim 1, wherein one color filter is formed in the aperture for the first light sensor unit.

8. The display device according to claim 7, further comprising
a backlight configured to emit display light to the display area.

9. The display device according to claim 8, wherein
a plurality of the first light sensor units are each arranged adjacent to a respective one of the display cells.

10. The display device according to claim 8, wherein
the effective display area unit has a first transparent substrate that is disposed to face the backlight and has a cell circuit and a light-receiving element formed on the first transparent substrate, and a second transparent substrate disposed to face the first transparent substrate, and the effective display area unit has a liquid crystal layer disposed between the first transparent substrate and the second transparent substrate, and a light-blocking mask that is formed for the first light sensor unit and the second light sensor unit and blocks light,
apertures for guiding light to the light-receiving element are formed in the light-blocking mask for the first light sensor unit and the second light sensor unit, and
the infrared filter is formed in the aperture for the second light sensor unit.

11. The display device according to claim 10, wherein one color filter is formed in the aperture for the first light sensor unit.

12. The display device according to claim 1, wherein the infrared filter is formed by stacking a red color filter and a blue color filter.

13. The display device according to claim 12, wherein
a green color filter is disposed on an optical path to the light-receiving element of the first light sensor.

14. The display device according to claim 12, wherein
in an optical path to the light-receiving element of the first light sensor, the aperture is provided without a color filter.

15. The display device according to claim 1, wherein
the infrared filter is formed by stacking a red color filter, a green color filter, and a blue color filter.

16. An electronic apparatus having a display device, the display device comprising:
a plurality of display cells are arranged in an effective display area unit;
a first light sensor unit configured to include a light-receiving element and detect intensity of ambient light to a display area; and
a second light sensor unit configured to include a light-receiving element and be provided with an infrared filter disposed on an optical path to the light-receiving element,
wherein the first light sensor unit and the second light sensor unit with the infrared filter are formed in the effective display area unit,
wherein a signal processor configured to subtract a detection signal of the second light sensor unit from a detection signal of the first light sensor unit,
wherein the infrared filter is formed by stacking at least two kinds of color filters, and
wherein a first aperture for guiding light to the light-receiving element for the first light sensor unit is formed in a first light-blocking mask, a second aperture for guiding light to the light-receiving element for the second light sensor unit is formed in a second light-blocking mask, the infrared filter is formed in the aperture, and the first and second light-blocking masks are formed between adjacent display cells in the effective display area unit.

17. A display device comprising:
a plurality of display cells are arranged in an effective area display area unit;
first light sensor means for including a light-receiving element and detecting intensity of ambient light to a display area; and
second light sensor means for including a light-receiving element and being provided with an infrared filter disposed on an optical path to the light-receiving element,
wherein the first light sensor means and the second light sensor means with the infrared filter are formed in the effective display area unit,
wherein signal processing means for subtracting a detection signal of the second light sensor means from a detection signal of the first light sensor means,
wherein the infrared filter is formed by stacking at least two kinds of color filters, and
wherein a first aperture for guiding light to the light-receiving element for the first light sensor unit is formed in a first light-blocking mask, a second aperture for guiding light to the light-receiving element for the second light sensor unit is formed in a second light-blocking mask, the infrared filter is formed in the aperture, and the first and second light-blocking masks are formed between adjacent display cells in the effective display area unit.

18. An electronic apparatus having a display device, the display device comprising:
a plurality of display cells are arranged in an effective display area unit;
first light sensor means for including a light-receiving element and detecting intensity of ambient light to a display area; and
second light sensor means for including a light-receiving element and being provided with an infrared filter disposed on an optical path to the light-receiving element,
wherein the first light sensor means and the second light sensor means with the infrared filter are formed in the effective display area unit,
wherein signal processing means for subtracting a detection signal of the second light sensor means from a detection signal of the first light sensor means,
wherein the infrared filter is formed by stacking at least two kinds of color filters, and
wherein a first aperture for guiding light to the light-receiving element for the first light sensor unit is formed in a first light-blocking mask, a second aperture for guiding light to the light-receiving element for the second light sensor unit is formed in a second light-blocking mask, the infrared filter is formed in the aperture, and the first and second light-blocking masks are formed between adjacent display cells in the effective display area unit.

* * * * *